United States Patent
Hassforther et al.

(10) Patent No.: US 10,552,605 B2
(45) Date of Patent: Feb. 4, 2020

(54) ANOMALY DETECTION IN ENTERPRISE THREAT DETECTION

(71) Applicant: SAP SE, Walldorf (DE)

(72) Inventors: Jona Hassforther, Heidelberg (DE); Jens Baumgart, Dossenheim (DE); Thorsten Menke, Bad Iburg (DE); Volker Guzman, Heidelberg (DE); Florian Kraemer, Dielheim (DE); Anne Jacobi, Wiesloch (DE); Thanh-Phong Lam, Heidelberg (DE); Omar-Alexander Al-Hujaj, Bad Schönborn (DE); Kathrin Nos, Nussloch (DE)

(73) Assignee: SAP SE, Walldorf (DE)

(*) Notice: Subject to any disclaimer, the term of this patent is extended or adjusted under 35 U.S.C. 154(b) by 8 days.

(21) Appl. No.: 15/382,056

(22) Filed: Dec. 16, 2016

(65) Prior Publication Data
US 2018/0173873 A1  Jun. 21, 2018

(51) Int. Cl.
*H04L 29/06*  (2006.01)
*G06F 21/55*  (2013.01)
*G06T 11/20*  (2006.01)

(52) U.S. Cl.
CPC .......... *G06F 21/552* (2013.01); *G06T 11/206* (2013.01); *G06T 2200/24* (2013.01)

(58) Field of Classification Search
CPC ........ H04L 63/14; H04L 43/045; G06F 21/55
See application file for complete search history.

(56) References Cited

U.S. PATENT DOCUMENTS

| | | | |
|---|---|---|---|
| 5,440,726 A | 8/1995 | Fuchs | |
| 5,960,170 A | 9/1999 | Chen | |
| 6,173,418 B1 | 1/2001 | Fujino et al. | |
| 6,629,106 B1 | 9/2003 | Narayanaswamy | |
| 6,779,001 B1 | 8/2004 | Kanai et al. | |
| 7,376,969 B1 | 5/2008 | Njemanze | |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |
| 7,457,793 B2 | 11/2008 | Weigt et al. | |

(Continued)

OTHER PUBLICATIONS

Office Action in related U.S. Appl. No. 15/216,201 dated Mar. 7, 2018; 14 pages.

(Continued)

*Primary Examiner* — Izunna Okeke
(74) *Attorney, Agent, or Firm* — Fish & Richardson P.C.

(57) ABSTRACT

A selection of data types is defined from available log data for an evaluation of events associated with an entity. One or more evaluations associated with the entity are defined and reference data is generated from the selection of data types based on the one or more defined evaluations. The one or more evaluations are grouped into a pattern. A three dimensional (3D) score diversity diagram visualization is initialized for display in a graphical user interface, where a point representing the entity in the visualization is localized in 3D space at a coordinate based on two-dimensional (2D) coordinates in a 2D coordinate system of a centroid of the calculated area of a polygon placed to into the 2D coordinate system and defined by the values of each evaluation associated with the entity.

15 Claims, 17 Drawing Sheets

(56) References Cited

U.S. PATENT DOCUMENTS

| | | |
|---|---|---|
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 * | 12/2017 | Averbuch ............ H04L 63/1416 |
| 9,979,741 B2 | 5/2018 | Fuhrman |
| 10,001,389 B1 | 6/2018 | Das et al. |
| 10,079,842 B1 | 9/2018 | Brandwine et al. |
| 10,102,379 B1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0333384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |

(56) References Cited

U.S. PATENT DOCUMENTS

| | | | |
|---|---|---|---|
| 2016/0373476 | A1 | 12/2016 | Dell'anno et al. |
| 2016/0378978 | A1 | 12/2016 | Singla |
| 2016/0381049 | A1 | 12/2016 | Lakhani |
| 2017/0004005 | A1 | 1/2017 | Elliott |
| 2017/0026400 | A1 | 1/2017 | Adams et al. |
| 2017/0031002 | A1 | 2/2017 | Newton et al. |
| 2017/0034023 | A1 | 2/2017 | Nickolov |
| 2017/0070415 | A1 | 3/2017 | Bell et al. |
| 2017/0091008 | A1 | 3/2017 | Cherbakov |
| 2017/0093902 | A1 | 3/2017 | Roundy et al. |
| 2017/0148060 | A1 | 5/2017 | Showers |
| 2017/0169217 | A1 | 6/2017 | Rahaman |
| 2017/0251365 | A1 | 8/2017 | Burchard |
| 2017/0270006 | A1 | 9/2017 | Kankylas |
| 2017/0279837 | A1 | 9/2017 | Dasgupta |
| 2017/0287179 | A1 | 10/2017 | Tibshirani et al. |
| 2017/0302685 | A1 | 10/2017 | Ladnai et al. |
| 2017/0308602 | A1 | 10/2017 | Raghunathan et al. |
| 2017/0316026 | A1 | 11/2017 | Kanthak et al. |
| 2017/0322993 | A1 | 11/2017 | Brodt et al. |
| 2017/0324766 | A1 | 11/2017 | Gonzalez |
| 2018/0027002 | A1 | 1/2018 | Rodeck et al. |
| 2018/0027010 | A1 | 1/2018 | Pritzkau et al. |
| 2018/0059876 | A1 | 3/2018 | Peng et al. |
| 2018/0063167 | A1 | 3/2018 | Rodeck |
| 2018/0091535 | A1 | 3/2018 | Chrosziel |
| 2018/0091536 | A1 | 3/2018 | Chrosziel et al. |
| 2018/0157835 | A1 | 6/2018 | Nos |
| 2018/0173872 | A1 | 6/2018 | Lam et al. |
| 2018/0176234 | A1 | 6/2018 | Kunz et al. |
| 2018/0176235 | A1 | 6/2018 | Lam et al. |
| 2018/0176238 | A1 | 6/2018 | Nos et al. |
| 2018/0234447 | A1 | 8/2018 | Mueen |
| 2019/0005423 | A1 | 1/2019 | Pritzkau et al. |
| 2019/0007435 | A1 | 1/2019 | Pritzkau et al. |

OTHER PUBLICATIONS

Office Action in related U.S. Appl. No. 15/274,569 dated Apr. 16, 2018; 11 pages.
U.S. Office Action in related U.S. Appl. No. 15/274,569 dated Nov. 14, 2018, 11 pages.
U.S. Office Action in related U.S. Appl. No. 15/274,693 dated Feb. 11, 2019, 13 pages.
U.S. Office Action in related U.S. Appl. No. 15/274,693 dated Jul. 26, 2018, 14 pages.
U.S. Office Action in related U.S. Appl. No. 15/216,201 dated Jul. 20, 2018, 15 pages.
U.S. Office Action in related U.S. Appl. No. 15/253,438 dated Sep. 19, 2018, 17 pages.
U.S. Office Action in related U.S. Appl. No. 15/246,053 dated May 21, 2018, 14 pages.
U.S. Office Action in related U.S. Appl. No. 15/246,053 dated Sep. 24, 2018, 14 pages.
U.S Office Action in related U.S. Appl. No. 15/370,084 dated Aug. 27, 2018, 14 pages.
U.S. Office Action in related U.S. Appl. No. 15/370,084 dated Feb. 4, 2019, 9 pages.
U.S. Office Action in related U.S. Appl. No. 15/380,450 dated Aug. 27, 2018, 19 pages.
U.S. Office Action in related U.S. Appl. No. 15/380,450 dated Jan. 23, 2019, 21 pages.
U.S. Office Action in related U.S. Appl. No. 15/380,450 dated Nov. 2, 2018, 19 pages.
U.S. Office Action in related U.S. Appl. No. 15/380,379 dated Jul. 19, 2018, 9 pages.
U.S. Office Action in related U.S. Appl. No. 15/381,567 dated Nov. 2, 2018, 17 pages.
U.S. Office Action in related U.S. Appl. No. 15/383,771 dated Aug. 3, 2018, 12 pages.
U.S. Office Action in related U.S. Appl. No. 15/383,771 dated Jan. 23, 2019, 14 pages.
Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.
Final Office Action issued in U.S. Appl. No. 15/381,567 dated May 22, 2019, 28 pages.
Non-Final Office Action issued in U.S. Appl. No. 15/216,046 dated Apr. 29, 2019, 23 pages.
Non-Final Office Action issued in U.S. Appl. No. 15/246,053 dated May 17, 2019, 28 pages.
Non-Final Office Action issued in U.S. Appl. No. 15/274,569 dated Mar. 22, 2019, 11 pages.
Non-Final Office Action issued in U.S. Appl. No. 15/639,863 dated Jun. 24, 2019, 37 pages.
Office Action issued in U.S. Appl. No. 15/216,046 dated Aug. 21, 2019, 23 pages.
Office Action issued in U.S. Appl. No. 15/847,478, dated Aug. 6, 2019, 36 pages.
U.S. Office Action in related U.S. Appl. No. 15/383,771 dated Jul. 5, 2019, 16 pages.

* cited by examiner

FIG. 9

ANOMALY DETECTION IN ENTERPRISE THREAT DETECTION

BACKGROUND

Enterprise threat detection (ETD) typically collects and stores a large amount of log data from various systems associated with an enterprise computing system to permit security of heterogeneous computing landscapes (for example, Big Data and other computing systems). The stored log data is normally purged on a periodic basis to conserve storage and computing resources. As a result, threats which can be found only in correlation with several events and in comparison with known past behavior are difficult to determine and to visualize once the collected log data is unavailable for further processing. The stored log data is usually analyzed using statistical analysis and forensic-type data analysis tools to identify suspicious behavior and to allow an appropriate response. Statistical analysis using standard normal deviation permits identification of anomalies in the log data, but not the building of individual evaluations/patterns or the reduction of anomaly alert/indication false positives. Enhanced ETD functionality with a more precise evaluation method is needed to detect anomalies and to support related ETD functions.

SUMMARY

The present disclosure describes methods and systems, including computer-implemented methods, computer program products, and computer systems for anomaly detection in enterprise threat detection (ETD) using statistical methods.

In an implementation, a selection of data types is defined from available log data for an evaluation of events associated with an entity. One or more evaluations associated with the entity are defined and reference data is generated from the selection of data types based on the one or more defined evaluations. The one or more evaluations are grouped into a pattern. A three dimensional (3D) score diversity diagram visualization is initialized for display in a graphical user interface, where a point representing the entity in the visualization is localized in 3D space at a coordinate based on two-dimensional (2D) coordinates in a 2D coordinate system of a centroid of the calculated area of a polygon placed to into the 2D coordinate system and defined by the values of each evaluation associated with the entity.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described methodology and user interface (UI) permit large of amounts of raw log data from various systems associated with an enterprise computing system to be analyzed in order to find suspicious behavior. Additionally, threats can be discovered due to correlation between several events and known prior behavior. Second, the methodology and UI provide rich statistical and visualizations which permit a security expert to quickly note outlier values for a particular evaluation and to determine whether the detected outlier value is critical and requires further investigation. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 9 is a screenshot illustrating an example ETD anomaly detection lab analysis GUI illustrating an example evaluation observing system communication behavior, according to an implementation.

Like reference numbers and designations in the various drawings indicate like elements.

DETAILED DESCRIPTION

Figure 1:
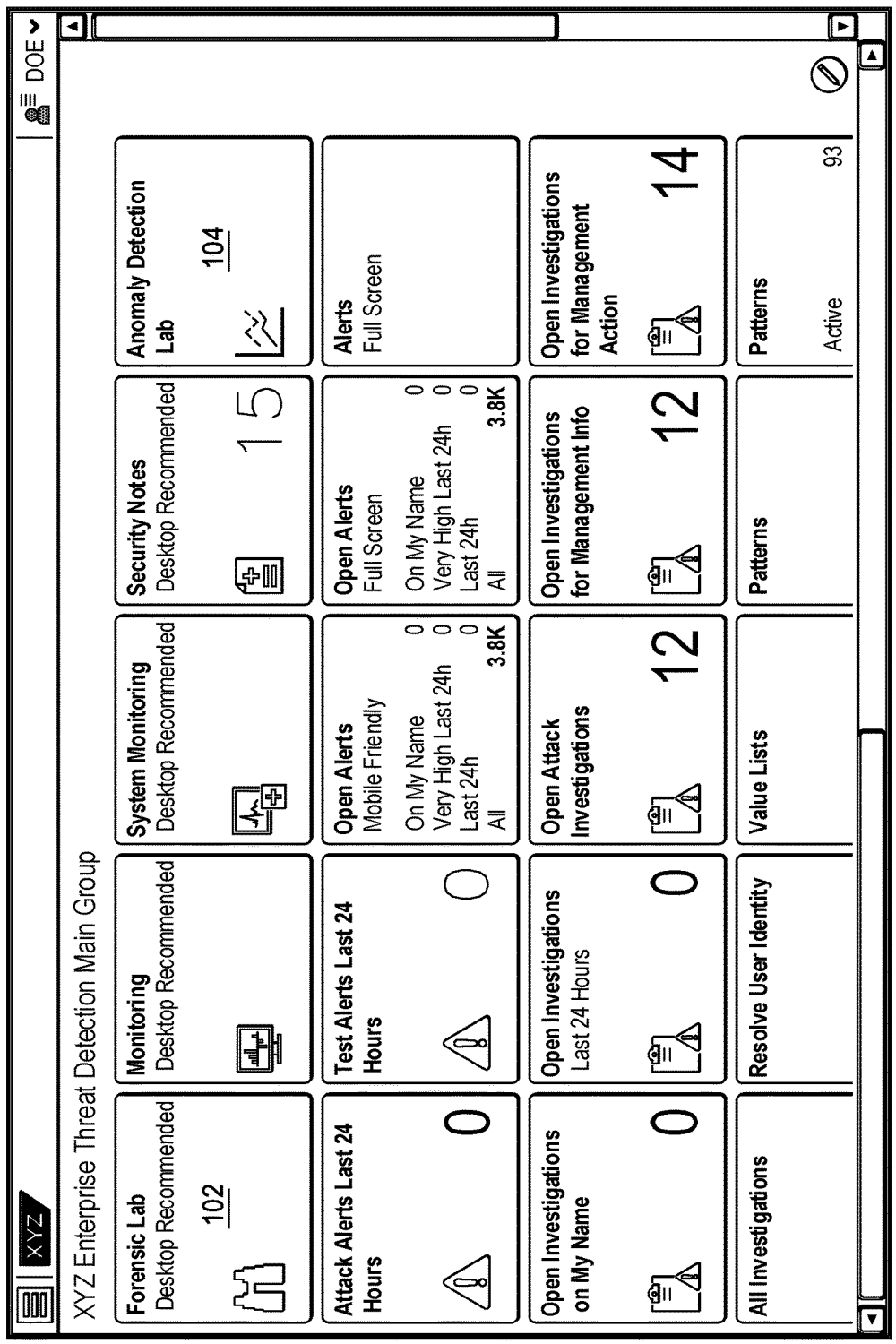
FIG. 1 is a screenshot illustrating an example enterprise threat detection (ETD) anomaly detection lab upper level graphical user interface (GUI), according to an implementation.

The following detailed description describes enhanced enterprise threat detection (ETD) using statistical methods and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Enterprise threat detection (ETD) typically collects and stores a large amount of log data from various systems associated with an enterprise computing system to permit security of heterogeneous computing landscapes (for example, Big Data and other computing systems). The stored log data is normally purged on a periodic basis to conserve storage and computing resources. As a result, threats which can be found only in correlation with several events and in comparison with known past behavior are difficult to determine and to visualize once the collected log data is unavailable for further processing. The stored log data is usually analyzed using statistical analysis and forensic-type data analysis tools to identify suspicious behavior and to allow an appropriate response. Statistical analysis using standard normal deviation permits identification of anomalies in the log data, but not the building of individual evaluations/patterns or the reduction of anomaly alert/indication false positives. Enhanced ETD functionality with a more precise evaluation method is needed to detect anomalies and to support related ETD functions.

At a high-level, the discussed enhanced ETD functionality includes the ability to handle individuality of customer data. Each evaluation can define, for example, characteristics including: 1) generation of charts created in an ETD Forensic Lab, which define what is being observed; 2) choosing an underlying evaluation method, which can be a statistical analysis based on a Standard Normal Distribution or detecting a new occurrence of what is being observed; and 3) defining a time range and a time unit of the reference data to be analyzed.

Patterns based on the created evaluations can then be created. Variables associated with patterns can include: 1) a selected set of evaluations which are relevant for a particular pattern; 2) notification options (for example, using some type of indicator—such as on a Graphical User Interface (GUI), message, etc.—or an alert) for when at least one evaluation indicates an anomaly, all evaluations indicate an anomaly, an average of Evaluations indicate an anomaly, etc. The result of pattern executions are integrated into an ETD Alert framework and GUI. Additionally, an alert-associated GUI is enhanced with visualizing observation data deviation to verify which observation(s) indicate anomalies.

For a particular entity (for example, a user—human being, technical user, etc., system—backend server system, etc.), relevant data for specified evaluations associated with the entity (for example, characteristics and on time-based information such as day-of-week, hour-of-day, etc.) received in raw log file data is copied to a database as reference data (for example, in one or more dedicated database tables). In typical implementations, the database can be an in-memory database. In alternative implementations, the database can be a conventional database, a combination of in-memory and conventional databases, or other type of database consistent with the requirements of this disclosure as would be understood by those of ordinary skill in the art. The reference data is typically a subset of the received raw log file data. Database tables for the reference data (and further processed reference data) are designed to store data for specified evaluations for outlier value detection. For example, if a specified evaluation is "number of logons," a number of logons grouped by user can be stored together with current date/time information as reference data for the "number of logons" evaluation.

Stored reference data is processed based on a particularly defined aggregation level for a particular evaluation determined by entity-based characteristics and on time-based information (for example, day-of-week and hour-of-day). In some implementations, data that "maps" a level of aggregation and particular entity-based characteristics/time-based information associated with a particular evaluation can be stored (for example, in the database) for reference by the described methodology. Other methods of determining particular aggregation levels are also considered to be within the scope of this disclosure. As an example, for the above-described "number of logons" example, from the generated reference data, the reference data can be processed where the "mapping" data specifies that the processed reference data is stored not on a current date/time information level (as with the reference data) but is instead aggregated on, for example, a day-of-week, hour-of-day, etc. basis and according to relevant attributes associated with the "number of logons" evaluation (for example, user, terminal, system identification, etc.). Aggregation can be performed on one or more values depending on particular needs, desires, or particular implementations of the described subject matter. During processing of the reference data, an expected value and standard deviation for each evaluation is typically calculated.

Each particular entity is associated with an "evaluation space" storing evaluations associated with the particular entity (for example, number of report calls, number of outbound calls, number of inbound calls, number of logon attempts, number of failed logon attempts, number of all successful logon attempts, and number of transaction calls.

A standard deviation evaluation score is calculated and normalized for each evaluation in the evaluation space associated with the particular entity. For example, for a particular evaluation, data from a certain time frame (for example, Wednesday, July 4, 13:00-14:00) is checked against the standard deviation value for the evaluation for this hour. If at any point an actual evaluation score exceeds (outlies) the calculated standard deviation evaluation score, the actual evaluation score is indicated as an outlier value on a user interface to permit a security expert to quickly visualize a deviation of the evaluation values for the particular evaluation to allow the security expert to judge whether the detected outlier is critical and needs further investigation (for example, the outlier value exceeds a determined threshold value, the particular evaluation is itself deemed critical, etc.).

The ETD system is able to calculate/re-calculate the processed reference data at any time based on the stored reference data. For example, for an example evaluation "Transaction Call" in an evaluation space named "User," all transaction calls for a certain day are read and stored (for example, as described above) as reference data. The data is then aggregated (for example, as described above) by day-of-week, hour-of-day, user, and transaction code and then stored for ETD use. Afterwards all reference data for that evaluation can be re-read and again aggregated on day-of-week, hour-of-day, user, and transaction code and the newly processed reference data used to replace the previously generated processed reference data. In other examples, the reference data can be re-read and aggregated using different aggregation parameters (for example, day-of month, minute-of-hour, user, and transaction code).

As will be appreciated by those of ordinary skill in the art, the following example user interfaces are just one possible implementation of user interfaces capable of providing the functionality described in this disclosure. The example figures are not considered to limit the inventive concept and not all aspects, elements, or particular implementations of the provided example figures are considered to be necessary/required to accomplish the described functionalities. In some implementations, various user interfaces, elements of user interfaces, etc. can be combined or separated into fewer or more user interfaces, respectively, to accomplish the described functionality. Unless otherwise specified, other user interfaces consistent with the specification and claims are considered to also be within the scope of this disclosure.

FIG. 1 is a screenshot illustrating an example ETD main group GUI 100, according to an implementation. As illustrated as in typical implementations, the ETD main group user interface 100 comprises a plurality of selectable "tiles" to activate various functions related to ETD. For example, tile 102 is for a "Forensic Lab" and tile 104 is for "Anomaly Detection Lab." It should be noted that the illustrated tiles are for example only. Other functionalities, as understood by one of ordinary skill in the art and consistent with the specification and claims, are also considered to be within the scope of the disclosure. In this example figure, consider that a user has selected tile 104, "Anomaly Detection Lab" which will open an anomaly detection lab user interface (see, for example, FIG. 2).

Figure 2:
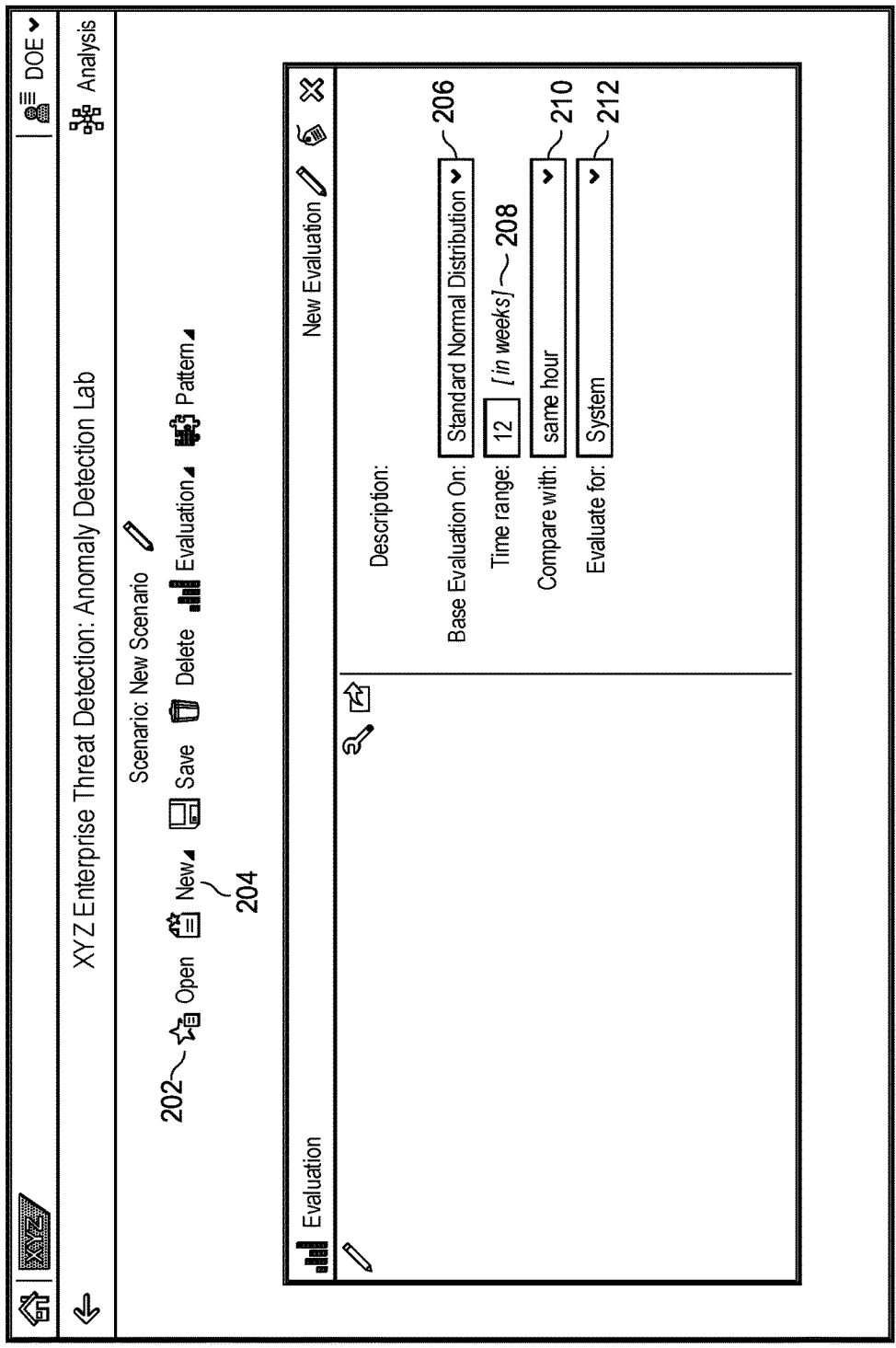
FIG. 2 is a screenshot illustrating an example ETD anomaly detection lab open pattern GUI, according to an implementation.

FIG. 2 is a screenshot illustrating an example ETD anomaly detection lab GUI 200, according to an implementation. In typical implementations, a user can select to open and review an existing evaluation using interface element 202 or configure a new evaluation using interface element 204. In a typical implementation if selecting element 204, the user is permitted to select a base evaluation value 206 (here "standard normal deviation" is selected and displayed), a time range 208 (here "12" in weeks), compared with value 210 (here "same hour"), and evaluate for 212. Field 212 defines what is being identified to evaluate as potentially anomalous (for example, a system, a user, network component, etc.). This information is derived from a chart of selected data types/values (not illustrated) that is assigned/associated with an evaluation. The chart defines what is desired to be observed in available log data. This chart is then added to the left side of FIG. 2 (not illustrated) as an evaluation. As an example, for a chart having "Program Calls of Systems" as content, the attribute in field 212 would be "System" and data types/values associated with program calls of systems in available log data is gathered for ETD analysis as reference data.

For base evaluation value 206, besides the illustrated "Standard Normal Distribution," other available evaluation methods consistent with this disclosure can also be made available for selection. For example, "new occurrence" is also an available option for the purposes of this disclosure. For time range 208, the time range of the reference data to evaluate is typically measured in weeks with a minimum of four weeks selectable). In other implementations, time can be measured in different units and minimum selectable time ranges can be greater or smaller than the equivalent of four weeks' time.

Value 210 allows a time comparison value. Here, "same hour" indicates that comparisons should be made for the same hour every day for the specified time period (for example, 13:00-14:00 every day). In other implementations, time comparison values can be selectable in different units, multiple time range selections, or other variations consistent with this disclosure. In the alternative, if element 202 is selected, an existing (previously defined) pattern can be selected from a resulting user interface (see, for example, FIG. 3).

Figure 3:
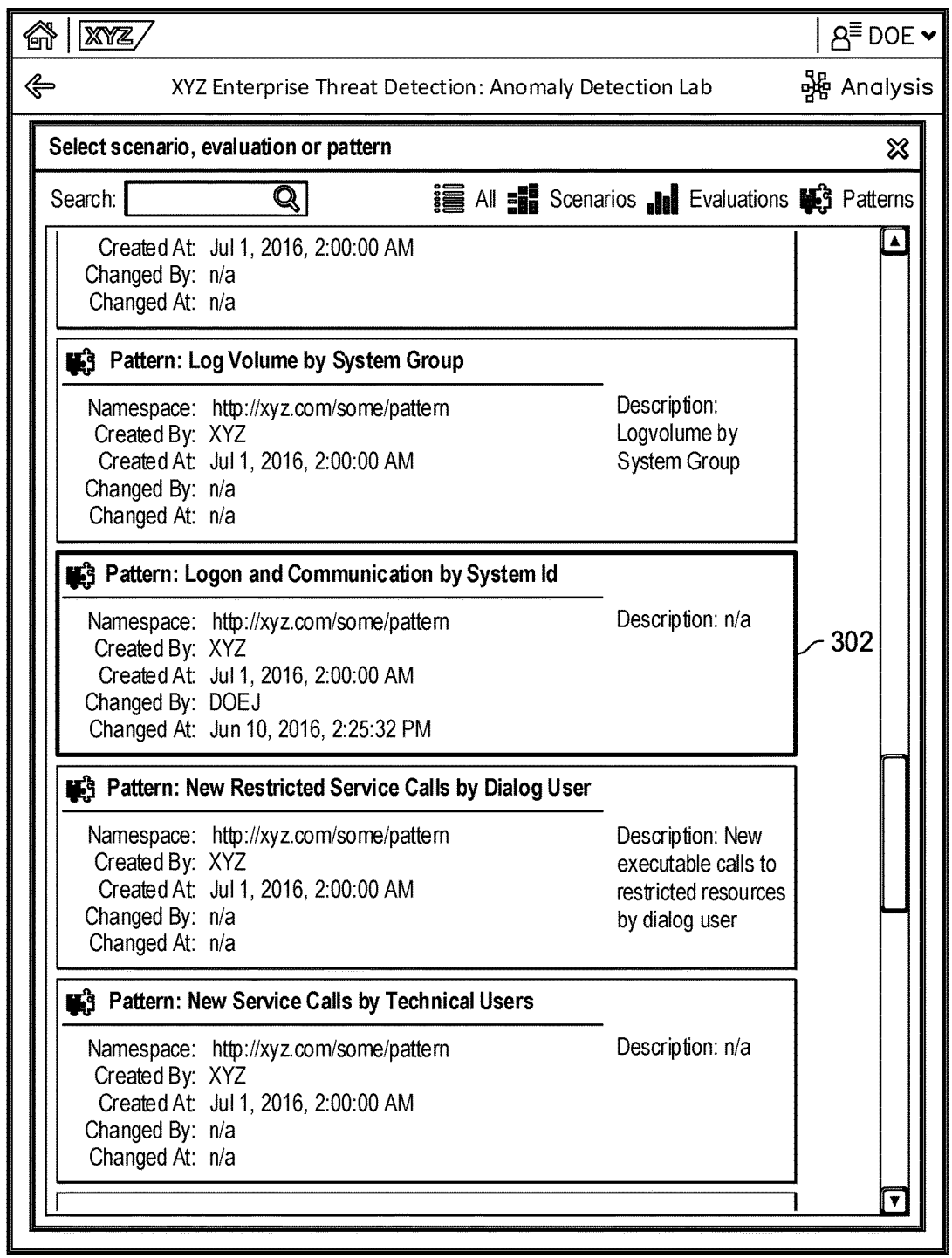
FIG. 3 is a screenshot illustrating an example ETD anomaly detection lab pattern selection GUI, according to an implementation.

FIG. 3 is a screenshot illustrating an example ETD anomaly detection lab pattern selection GUI 300, according to an implementation. For the purposes of this disclosure, a "pattern" can be considered to be an "evaluation space" as described above. As illustrated, the user chooses to select existing pattern "Logon and Communication by System Id" 302. In this implementation, the user interface element is selectable and also provides information about the pattern (for example, namespace, created by, created at, changed by, changed at, and description values). Once pattern 302 is opened (for example, by double-clicking pattern 302, selecting an "open" or similar user interface element (not illustrated), etc., the pattern is opened for user examination (see, for example, FIG. 4).

Figure 4:
FIG. 4 is a screenshot illustrating an example ETD anomaly detection lab pattern definition GUI, according to an implementation.

FIG. 4 is a screenshot illustrating an example ETD anomaly detection lab pattern definition GUI 400, according to an implementation. Note that this user interface is the same as that in FIG. 2, but now filled in with data corresponding to the pattern 302 selected in FIG. 3. Here, the pattern 302 selected in 302 is identified at 402. Panel 404 identifies and provides descriptive information for the selected pattern 302 (for example, Evaluation Output (here "Alert"), Create Output When (here, "Average of evaluations shows an anomaly"), Severity (here "Medium"), Status (here "Active"), and Test Mode (here checked ON)).

In typical implementations, Evaluation Output (here "Alert"), Create Output When (here, "Average of evaluations shows an anomaly"), Severity (here "Medium"), Status (here "Active"), and Test Mode (here checked ON)) means:

Evaluation Output: Defines what is being created when detecting an anomalous behavior. Either an alert (which needs to be processed or investigated by a monitoring agent) or an indicator only (in this case no processing of monitoring agent is required), Create Output When: Possible values are "All evaluations show an anomaly", "At least one evaluation shows an anomaly" or "Average of evaluations shows an anomaly,"

Severity: this defines the severity of an alert (if Alert is selected as Execution Output), and Test Mode: In case "Alert" is defined as Execution Output, then this option is available. This means that alerts are created as test alerts. No investigation is required by the monitoring agent.

Particular evaluations associated with pattern 302 to be observed are identified at 406 ("Successful LogOn Events by System Id"), 408 ("Failed LogOn Events by System Id"), and 410 ("Access to New Target System by System Id"). Evaluations use a standard normal distribution statistical calculation with a defined threshold indicating when the value of the standard normal distribution is to be considered unusual (an anomaly/outlier). This threshold value for each evaluation is then normalized in relation to all evaluations to a "score" value (more in FIG. 5).

Figure 5:
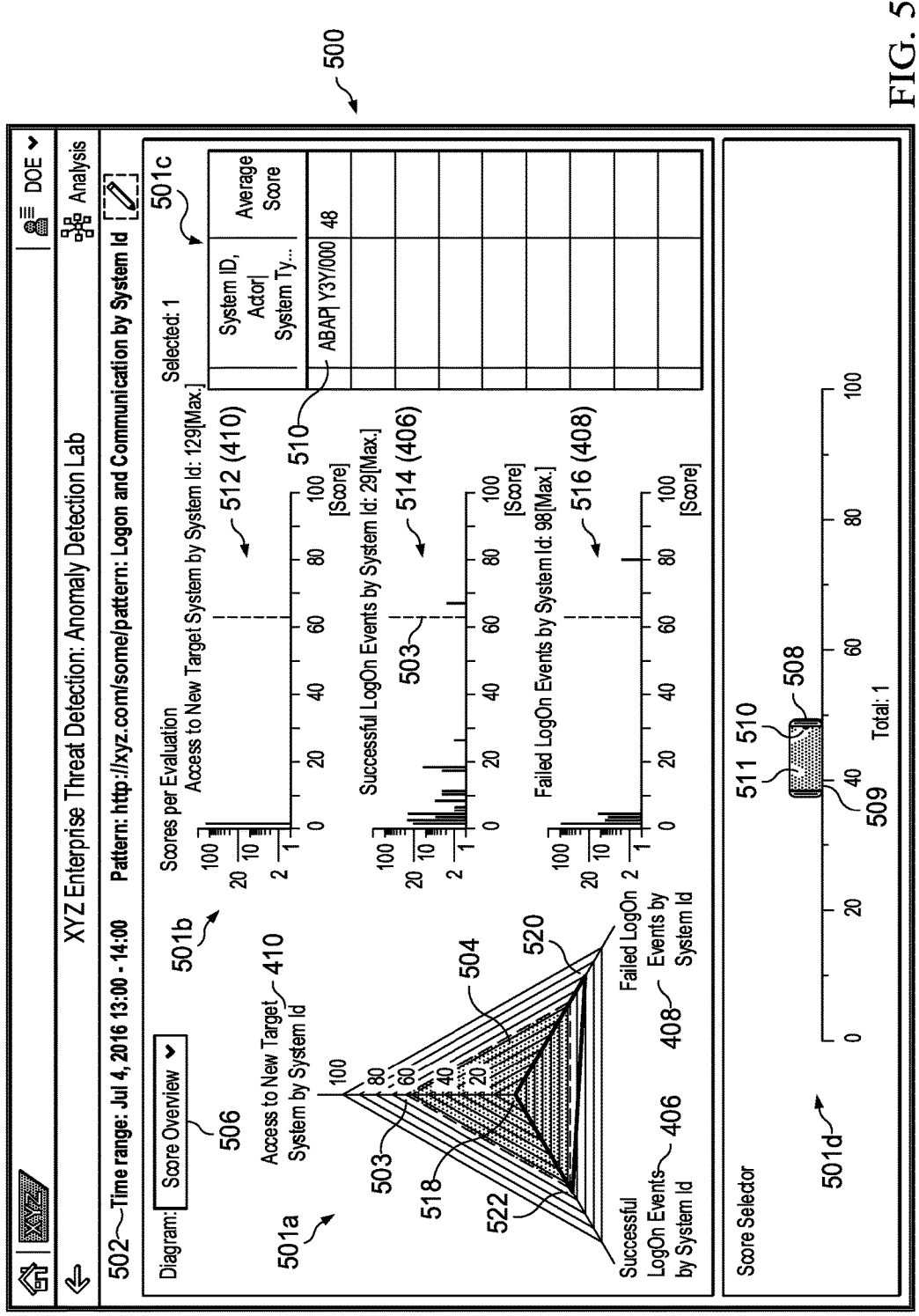
FIG. 5 is a screenshot illustrating an example ETD anomaly detection lab analysis GUI, according to an implementation.

In this example user interface 400, selecting element 412 will result in an evaluation score diagram for the selected pattern (see, for example, FIG. 5). In typical implementations, a pattern consists of a 1-to-n number of evaluations (refer to FIGS. 4 and 5 for additional detail. Patterns can be designed and defined using, at least in part, the various fields illustrated in FIG. 4. FIG. 5 illustrates a result of the pattern in FIG. 4 containing three evaluations corresponding to the three axes of the evaluation score diagram 501*a* and the evaluation graphs 501*b*. The GUI can manage patterns with multiple numbers of evaluations as a customer can create their own patterns having other numbers of evaluations.

FIG. 5 is a screenshot illustrating an example ETD anomaly detection lab analysis GUI 500, according to an implementation. The analysis user interface 500 is divided into an evaluation score diagram 501*a*, evaluation graphs 501*b*, entity table 501*c*, and score selector 501*d*.

The evaluations 406, 408, and 410 (refer to FIG. 4) are assigned to individual axes in the evaluation score diagram 501*a*. The standard deviation value for each axis of the designated time range 502 (here "Jul. 4, 2016 13:00-14:00") is indicated by the limits of the gray portion in the center of the evaluation score diagram 501*a* (for example, for evaluation 410, the standard deviation has been normalized as a threshold score 503 (here 63)). Note, that while FIG. 5 illustrates the normalized threshold score values for each axis to be the same value (63), the normalized threshold score values can, in some implementations, be different for each axis. In the illustration, lines are drawn between the normalized threshold score values of adjacent axes to generate a standard value zone 504. The zone 504 permits a user to quickly see whether any value plotted on the evaluation score diagram 500 is within or outside of the boundary of the standard value zone 504. If without, the value is considered an outlier and worthy of at least further analysis, determination of criticality, etc. Note that the diagram selector 506 is set to "Score Overview" resulting in the displayed evaluation score diagram 501*a*. In other implementations, while not illustrated, other visualizations are also possible.

A single entity (510) is identified in FIG. 5 for the selected average score in score selector 501*d*. Here entity 510 is indicated by a dot near the right side of the score selector ending range vertical bar 508. For example, a selected average evaluation score selection range 509 (in the illustrated implementation, both the right and left sides of the illustrated user interface selector 511 can be moved independently to the right or to the left and illustrate a evaluation score selection range of approximately 37-48) indicates that an entity (here 510) has a mean of selected normalized evaluation scores within that score range. In the selected entity information table 501*c*, entity 510 is identified as "ABAP|Y3Y/000" with a mean evaluation score (for the three illustrated evaluations (406, 408, and 410) of the selected pattern) of 48. The mean results from the addition of the calculated normalized evaluation scores for the three evaluations divided by three. Note that there can be multiple entities indicated within the selected score selection range 509 which would be displayed in the entity table 501*c* and reflected in the evaluation score diagram 501*a* for the selected evaluations in the evaluation graphs 501*b*.

Evaluation graphs 512, 514, and 516, detail information for evaluations 410, 406, and 408, respectively. Each evaluation graph is shown with a threshold score of 63. Anything above this is score value is considered an outlier. The evaluation graphs 512, 514, and 516 show the distribution of the entities (for example, systems, users, etc.) over their score. Note that for the purposes of this disclosure, evaluation graph 512 will be largely ignored as it is based on a different calculation method that is different from that used in evaluation graphs 514 and 516. For purposes of completeness, at a high level, evaluation 410 means that, for a corresponding system (here Y3Y—the actor system), a set of target systems is defined that the actor system communicates with. Here, in case a new target system (detected by System Id) is communicated with, an anomaly should be indicated (for example, a score of 73) could be assigned if entity 510 communicates with an unknown target system). For this discussion, the normalized score value here can be considered to be 0 as the entity 510 is only communicating with known target systems.

Note that the evaluation graphs 512, 514, and 516, corresponding to evaluations 410, 406, and 408, respectively, are not directly connected to the evaluation score diagram 501*a* the entity table 501*c*, or score selector 501*d*. The evaluation graphs provide the user with a distribution of how many entities (here systems) are acting within and without the acceptable range (here 63). The evaluation graphs indicate data for all entities.

As shown in FIG. 5, entity 510, for evaluations 410 and 406, has a score outside of an acceptable range and is considered anomalous. For example, evaluation graph 514 shows distribution values for evaluation 406 beyond (to the right of) the normalized score of 63 (here approximately 67). Evaluation graph 516 shows distribution values for evaluation 408 with a normalized score of 80. As a further explanation (a similar analysis is applicable to that of evaluation graph 516 for evaluation 408), for evaluation graph 514 (evaluation 406), for the selected time period (here "Jul. 4, 2016 13:00-14:00") a maximum of 29 different entities (here systems) are indicated as successfully logging on to entity 510 (ABAP|Y3Y/000). The analyzed data is received in logs sent from each of the 29 systems (indicating successful logon events). For a reference time range (for this pattern set to a value of four weeks), each occurrence of the successful logon event is saved. Every hour, every day, the number of successful logon events is saved as reference data. From the reference data, a median value can be calculated for the particular event, and then the standard deviation. Values outside the calculated standard deviation are considered anomalous. The further a value is from the standard deviation, the higher the assigned score value.

Continuing the prior example, the value 98 in evaluation graph 516 means that there are approximately 98 systems with normalized score values between 1 and 2. The value 29 in evaluation graph 514 means that there are approximately 29 systems with normalized score values between 2 and 3.

Referring back to FIG. 4, for evaluation 406, an associated Z-Score factor 407 is indicated with a value of "2." This means that a value of 2-times the standard deviation is to be considered within the "normal" (acceptable) range (where normalized means a normalized value from 0 to 63). For example, without the factor if the number of saved logon events for this evaluation is much higher than a defined range, it will then receive a normalize score higher than 63 even though fluctuations of the number of successful logon events may be still be considered acceptable. Here the factor helps adjust for this fluctuation and to keep the fluctuations from causing erroneous anomaly indications due to a higher than 63 normalized score.

Returning to FIG. 5, as described above, on the evaluation score diagram 501a, for entity 510 ("ABAP|Y3Y/000") in the specified time range 502, evaluation graph 512 illustrates that evaluation 410 has a normalized evaluation score of 0. This data point (the highest normalized score value) on the axis (at 518) corresponding to evaluation 410 is connected to corresponding data point 520 on the axis for evaluation 408 (here with a highest normalized score of 80). Similarly, the data point on the axis (at 522) corresponding to the highest normalized score of evaluation graph 514 (here 67) is connected back to data point 518 on the axis for evaluation 410 (here 0).

Figure 6:
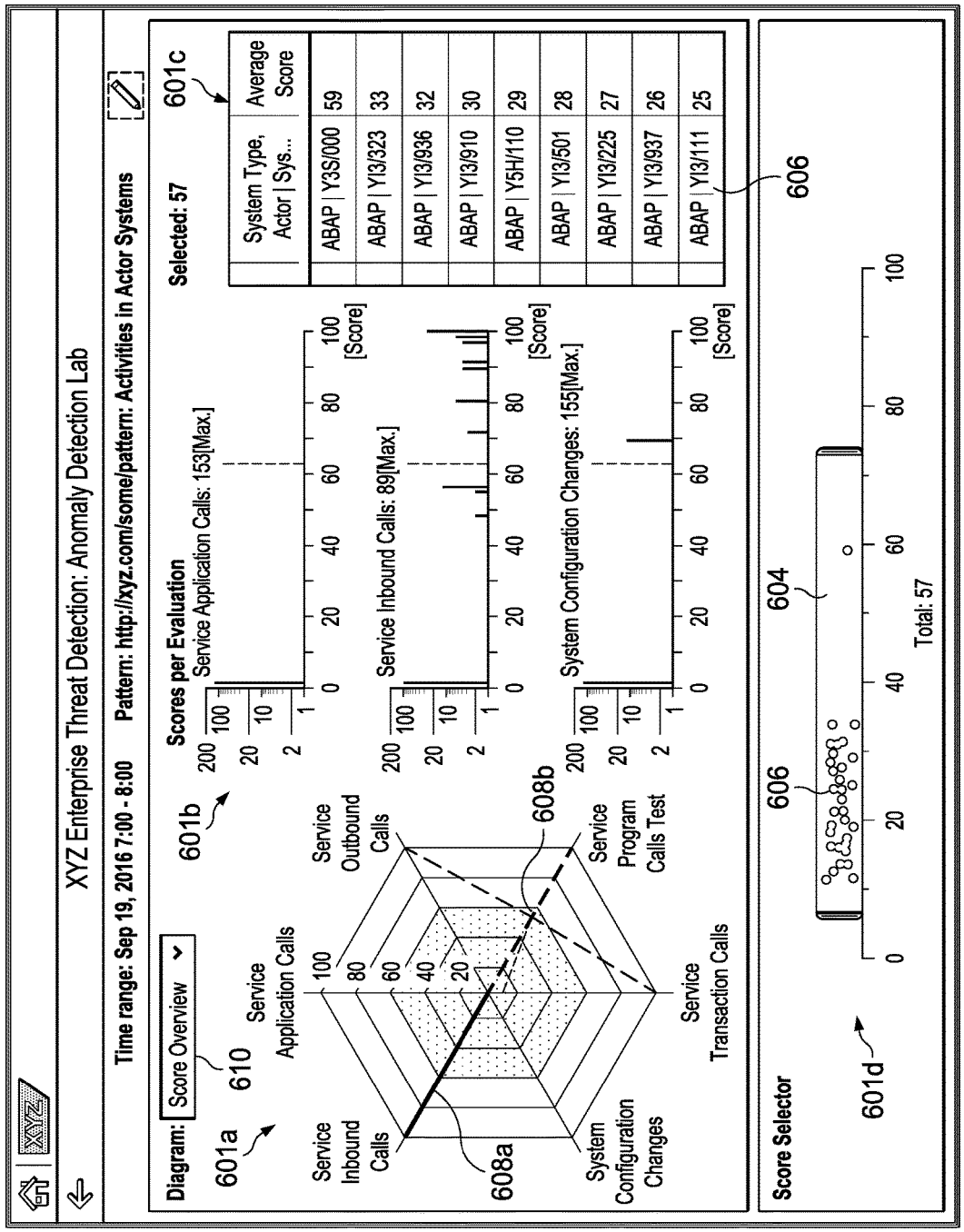
FIG. 6 is a screenshot illustrating an example ETD anomaly detection lab analysis GUI of FIG. 5 with an alternative evaluation score diagram, according to an implementation.

Turning to FIG. 6, FIG. 6 is a screenshot illustrating an example ETD anomaly detection lab analysis GUI 500 with an alternative evaluation score diagram 601a, according to an implementation. In contrast to the evaluation score diagram 501a of FIG. 5, the evaluation score diagram 601a is illustrated with six axes corresponding to particular evaluation graphs available for viewing in 60 lb.

As with FIG. 5, with the score selector 601d in FIG. 6, a user is able to choose a specific normalized score value range 604 and entities 606 within this range are displayed in the evaluation score diagram 601a as well as in entity table 601c. As in FIG. 5, because there can be many entities in a computing system landscape, representation in the evaluation score diagram 601a in the form of polygons or lines might be unclear as the polygons or lines can be displayed very near to, on top of each other, etc. (for example, as illustrated at 608a and 608b). Although the entities might have a similar normalized score value, with the evaluation score diagram representation it is difficult for the user to identify whether the entities have the same characteristics or whether they deviate from each other. For this reason, an additional diagram option of "Score Diversity" has been developed that is selectable using diagram selector 610.

Figure 7A:
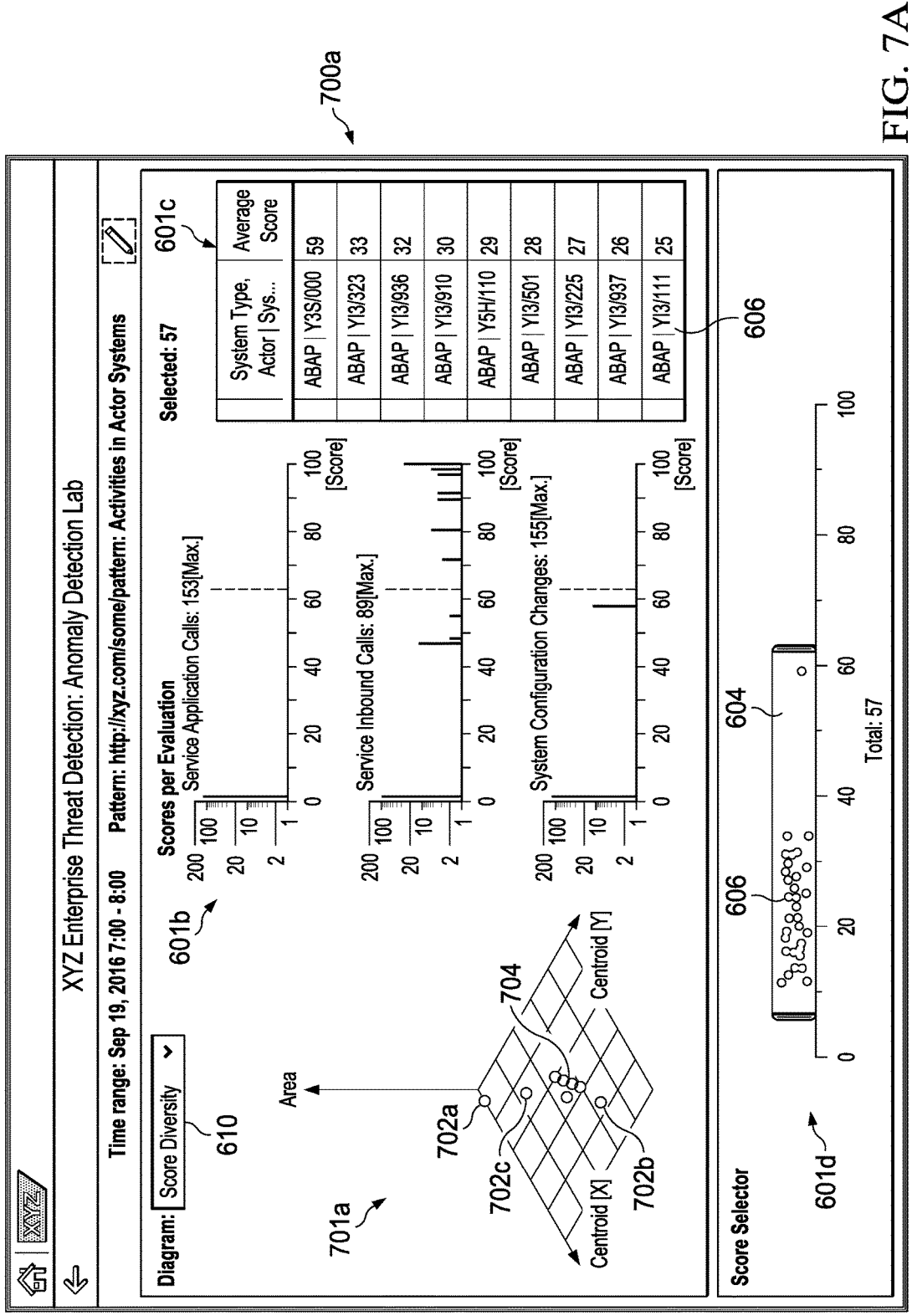
FIG. 7A is a screenshot illustrating an example ETD anomaly detection lab analysis GUI of FIG. 6 with a score diversity diagram, according to an implementation.

FIG. 7A is a screenshot illustrating an example ETD anomaly detection lab analysis GUI 700a (of FIG. 6) with a score diversity diagram 701a, according to an implementation. Note that user interface 700a is similar to user interface 600 of FIG. 6 with the diagram selector 610 set to "Score Diversity."

The Score Diversity visualization 701a represents entities 606 as with a graphical indicator (for example, an individual circle/sphere) in a three-dimensional (3D) coordinate system to emphasize similarity or diversity of the entities 606 based on characteristics of the entities 606. In the Score Diversity diagram 701a visualization, the further apart entities are from each other (in 3D space), the more diverse entity characteristics are considered to be. Conversely, the closer the entities are to each other in 3D space, the more similar they considered to be. For example, entity 702a is more diverse from entity 702b than entity 702c. Note that it can be easily seen that entities in entity group 704 should be relatively similar in characteristics based on how they are displayed in the Score Diversity diagram 701a.

The method used to determine entity 606 similarity or diversity is based on a geometric aspect. Geometrically in the evaluation score diagrams 501a and 601a of FIGS. 5 and 6, respectively, the different configurations of the polygons or lines indicate differences in entity characteristics. However, an evaluation score diagram makes calculation of differences and associated visual differentiation of the polygons or lines difficult. This is because visualization of polygons or lines in an evaluation score diagram is defined by the two attributes: 1) area and 2) centroid. Accordingly, different areas and centroids result in different polygons or lines in a generated evaluation score diagram.

In contrast, a Score Diversity diagram (for example, 701a) is based on three axes adding an additional dimension to the visualization:
 1. Centroid[X]=>x value of the polygons centroids,
 2. Centroid[Y]=>y value of the polygons centroids, and
 3. Area=>area of the polygons.
The Score Diversity diagram configuration can be considered a different way of clustering entity 606 characteristics to provide for more intuitive visual processing.

In typical implementations, there can be different numbers of entities in each type of analysis. The described methodology calculates each x/y value and a corresponding area of the polygon associated with each entity selected by an analyst. For additional information, refer to FIGS. 12B, 13A-13F, and associated description.

Figure 7B:
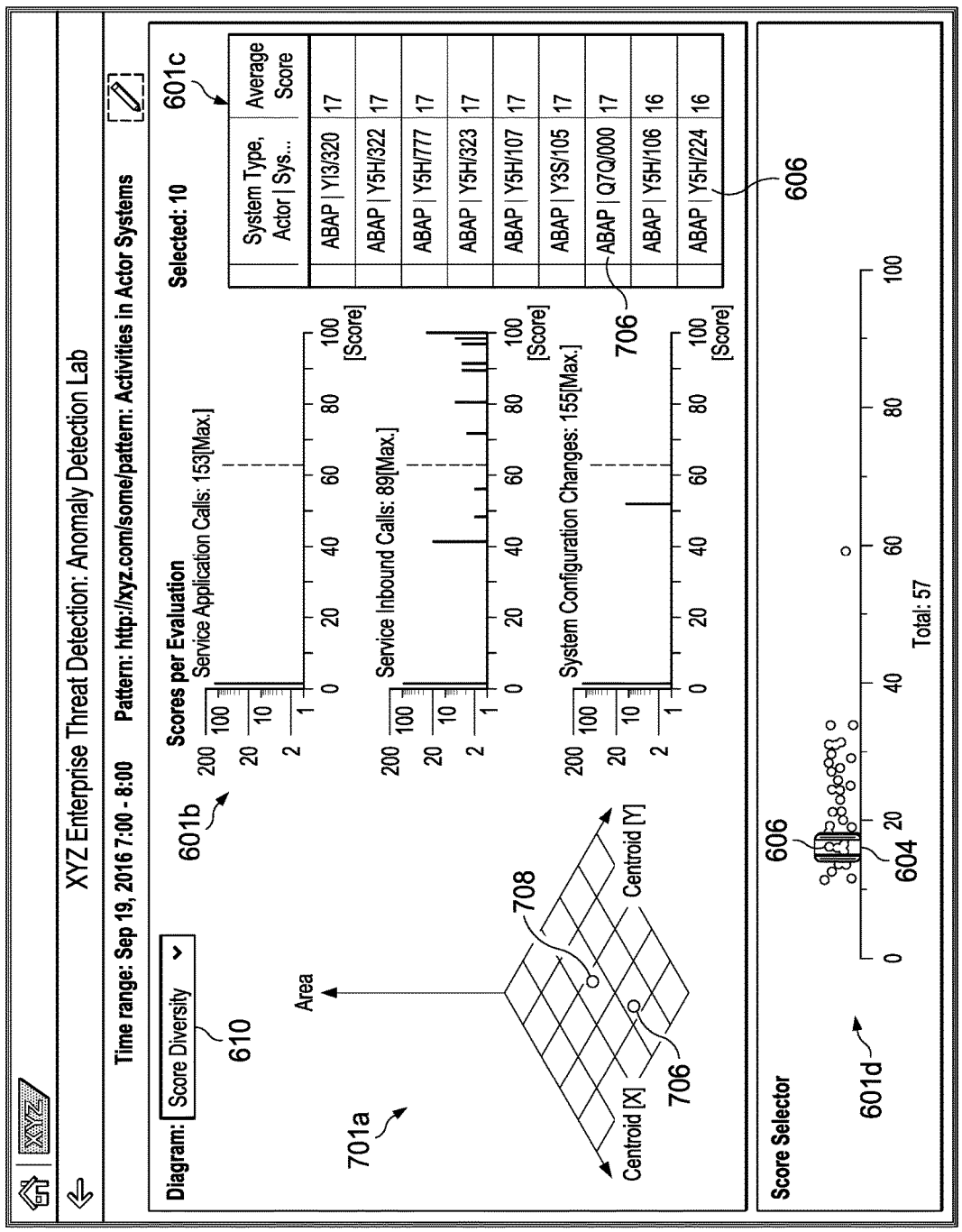
FIG. 7B is a screenshot illustrating an example ETD anomaly detection lab analysis GUI of FIG. 6 with an alternative score diversity diagram, according to an implementation.

FIG. 7B is a screenshot illustrating an example ETD anomaly detection lab analysis GUI 700b (of FIG. 6) with an alternative score diversity diagram 701a, according to an implementation. Note that user interface 700b is similar to user interface 600 of FIG. 6 with the diagram selector 610 set to "Score Diversity."

From a usability and security aspect, a desired use case for a Score Diversity diagram (for example, 701a) is for a user to be able to easily and quickly be able to detect entities which behave differently from other entities. The different behavior might be an indicator for anomalous behavior or activity by differently-acting entities. Note that in the example user interface 700b, the specific normalized score value range 604 has been reduced to a narrower range which results in fewer visualized entities in the Score Diversity diagram 701a and the entity table 601c. As visualized, entity "ABAP/Q7Q/000" (labeled 706 in the entity table 601c and in the Score Diversity diagram 701a) indicates possible suspicious behavior as entity 706 is geometrically deviated (here, down and slightly to the left) of the position of the other visualized entities in entity table 601c (which are clustered at 708). Here a user can easily see the deviation of characteristics values for each entity and can judge whether a detected outlier (here, entity 706) is critical and needs further investigation. In some implementations, if a user "hovers" a pointer (for example, a mouse pointer or other pointer associated with some other type of pointing device) over an entity within the Score Diversity Diagram 701a, the GUI can present information (such as, entity name, entity value, and other values associated with the entity) in a GUI tooltip-type dialog (not illustrated).

Figure 8:
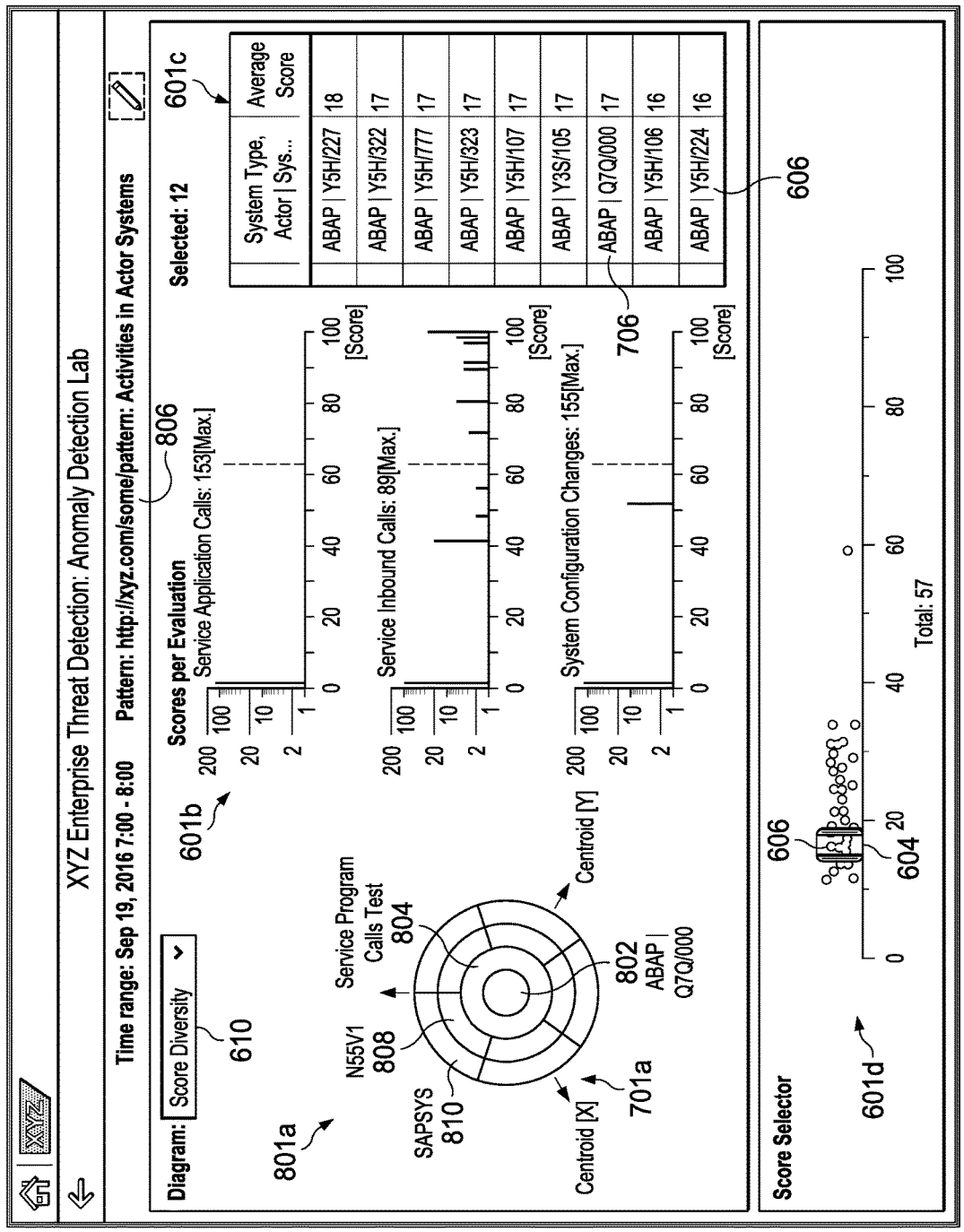
FIG. 8 is a screenshot illustrating an example ETD anomaly detection lab analysis GUI of FIG. 7B displaying a "Sunburst" visualization diagram, according to an implementation.

FIG. 8 is a screenshot illustrating an example ETD anomaly detection lab analysis GUI 800 (of FIG. 7B) displaying a "Sunburst" visualization diagram 801a, according to an implementation. Note that user interface 800 is user interface 700*b* of FIG. 7B following the selection of an entity circle/sphere in the Score Diversity diagram 701*a*.

Once an entity has been determined to be suspicious, the use case would involve further understanding details associated with the particular entity. The Score Diversity diagram 701*a* is configured to permit selection of entities (for example, entity 706 or among entity cluster 708. In some implementations, selecting the cluster 708 would result in a GUI element appearing that would allow a finer selection of the clustered entities associated with entity cluster 708. Additionally, in some implementations, hovering over an entity cluster can present a GUI element that permits a finer selection of the clustered entities associated with entity cluster 708. Other configurations of the GUI to permit finer selection of entities are also possible and considered to be within the scope of this disclosure.

As an example, a user selects entity 706 in the Score Diversity diagram 701*a*. Following selection of entity 706, a "Sunburst" diagram 801*a* is displayed as illustrated in FIG. 8. In the middle of the Sunburst diagram 801*a*, the name 802 of the associated entity is displayed (here, the entity (system) 706 ("ABAP/Q7Q/000"). Moving outward to the next level ring, evaluations 804 which are part of the currently selected ETD pattern are identified. Although pattern "http://test: beerg:Activities in Actor Systems" 806 contains more than one evaluation, only those evaluations are shown which have values in the currently analyzed log data. In the illustrated example of FIG. 8, only the evaluation 804 "Service Program Calls" is displayed, meaning for any other evaluation contained in the pattern, no values in the log are given.

Moving outward to the next level ring, concrete values of the evaluation are identified (for example, value 808 "SAPMSSY1." These values identify programs that have been executed.

Moving outward to the outermost level ring, the user who executed a particular program (identified in the previous ring value) is identified. In this example, the Sunburst diagram 801*a* indicates that an unusual number of program calls occurred in system 706 (ABAP/Q7Q/000) and it shows which programs were executed by whom. For example, the program for value 808 (SAPM55YI) was executed by user 810 ("SAPSYS"). In case of a pattern where a user is the observed entity, the last level would instead show systems. This configuration would answer the question as to what the particular user did in which system.

Figure 9:
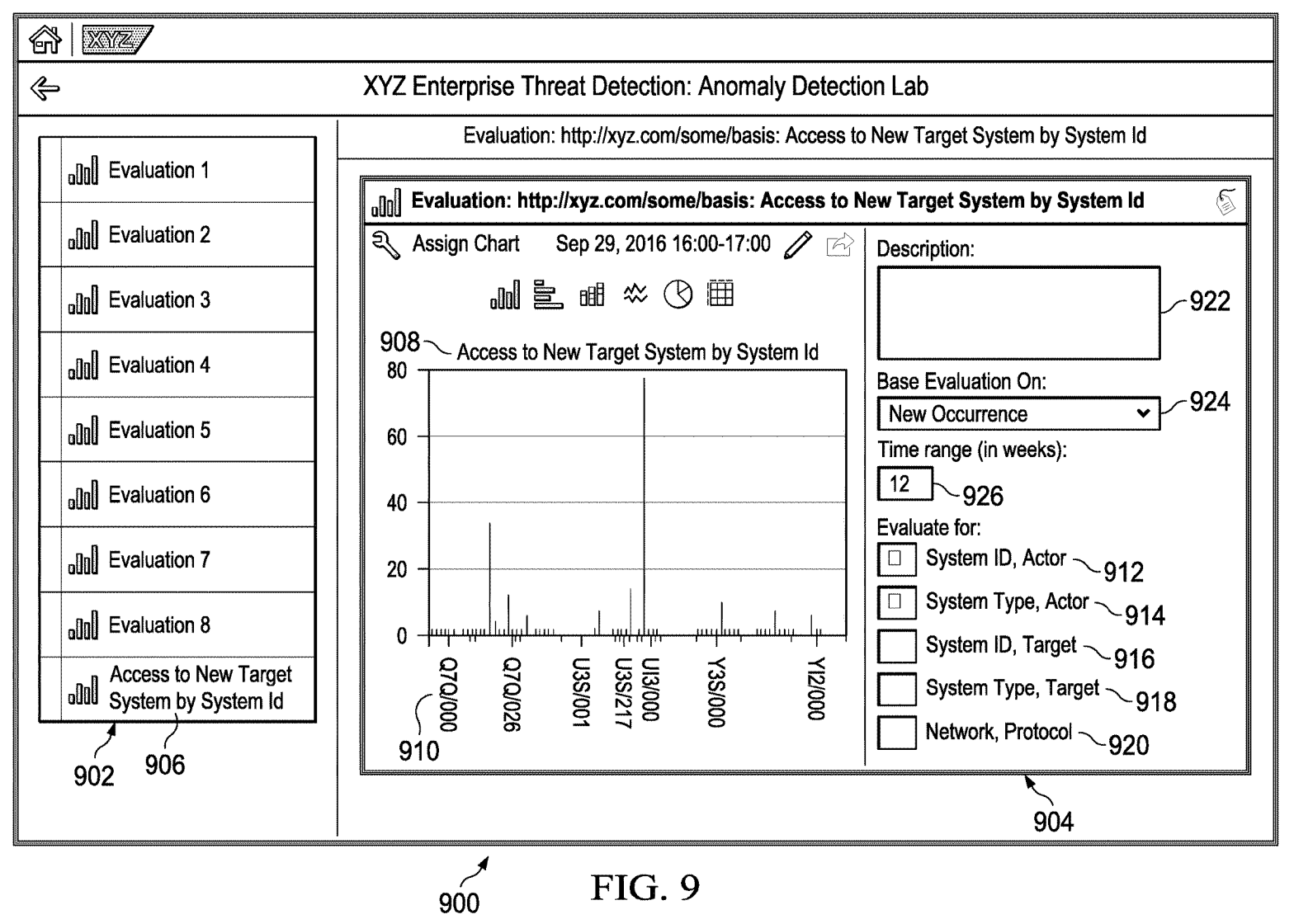

FIG. 9 is a screenshot illustrating an example ETD anomaly detection lab analysis GUI 900 illustrating an example evaluation observing system communication behavior, according to an implementation. The illustrated GUI is instantiated once a user selects an anomaly detection title describing the analysis they wish to perform. GUI 900 permits a user to select an evaluation in evaluation list 902 and review characteristics of the evaluation in review panel 904. For example, evaluation 906 (here, "Access to new Target System by System Id") display a chart 908 illustrating caller system 910 (defined by attributes "System ID, Actor" 912 and "System Type, Actor" 914), the called system (defined by attributes "System ID, Target" 916 and "System Type, Target" 918) and the used network protocol (defined as attribute "Network, Protocol" 920). The review panel 904 also permits review/entry of an evaluation description 922, evaluation basis 924 (here, "New Occurrence"), and a time range 926 (here in weeks and set to "12"). Note that, in typical implementations, if an evaluation basis 924 associated with a particular evaluation changes from a different value to that of "New Occurrence," alerts generated from patterns where the prior evaluation configuration is used and any aggregated data will be deleted. The GUI typically presents a dialog warning for user review and required affirmative confirmation by a user prior to saving the change. The selected attributes ("System ID, Actor" 912 and "System Type, Actor" 914) indicates on which level a matching procedure is based.

In normal operation, once the evaluation basis 924 is selected, the general taxonomy is to: 1) build a chart, 2) view charts, 3) group charts into an evaluation, 4) group evaluations into a pattern, and 5) group patterns into scenarios. This layered grouping functionality permits development of reusable and robust anomaly detection capabilities.

As an example, Table 1 lists data collected over a twelve week time period:

TABLE 1

| System ID, Actor | System Type, Actor | System ID, Target | System Type, Target | Network, Protocol |
|---|---|---|---|---|
| Q7Q/000 | ABAP | Y3S | ABAP | HTTP |
| Q7Q/000 | ABAP | Y3S | ABAP | HTTPS |
| Q7Q/000 | ABAP | YI3 | ABAP | RFC |

For a new occurrence, Table 2 illustrates that for system "Q7Q/000" no anomalous behavior is indicated because this connection is already contained in the list collected:

TABLE 2

| Q7Q/000 | ABAP | Y3S | ABAP | HTTP |

However, in Table 3, for system Q7Q/000, an anomalous behavior is detected (and an alert generated) because a new connection to system ABC has taken place:

TABLE 3

| Q7Q/000 | ABAP | ABC | ABAP | RFC |

Similarly, in Table 4, for system Q7Q/000, anomalous behavior is detected (and an alert generated) because new network protocol "RFC" has been used:

TABLE 4

| Q7Q/000 | ABAP | Y3S | ABAP | RFC |

Any change in the unselected attributes are evaluated as anomaly. In an example illustrated in Table 5, with Attributes A and B and Event 1 is a reference with values of 1 and 1 for Attributes A and B, respectively:

TABLE 5

| | New Occurrence | | |
|---|---|---|---|
| | [ ] (not marked) | [x] (marked) Reference | Note |
| | A | B | % |
| Event 1 | 1 | 1 | no Alert |
| Event 2 | 2 | 1 | Alert B1 in relation to A2 |
| Event 3 | 1 | 2 | Alert B2 in relation to A1 |

Table 5 illustrates that if Attribute B is marked as a viewed Attribute, then an alert will be generated if a change is Related to B. Event 2 produces an anomaly as A changed and there is a relationship with B. Event 3 produces an anomaly because there is a change in B itself and there is a relationship to A.

Figure 10:
FIG. 10 is a screenshot illustrating an example ETD anomaly detection lab analysis GUI for generated alert data, according to an implementation.

FIG. 10 is a screenshot illustrating an example ETD anomaly detection lab analysis GUI 1000 for generated alert data, according to an implementation. One method of accessing this GUI is selecting the alert as defined in a pattern as in FIG. 4 (for example, selecting either 406, 408, 410). Anomaly alerts are based on statistical data. The statistical data can be visualized as additional graphs, tables, charts, or any other form of data presentation consistent with this disclosure. The statistical data can be accessed using links (for example, links 1002-1016). For example, the link 1006 with the details of a Gaussian distribution (here, "average+/−standard deviation=1.3+/−1") or the link 1012 (here, "0 within confidence interval [0, 2100000]") can open an additional GUI (for example, a pop-up or other dialog, etc.) with a graphical display of the source data from which the standard normal distribution and observation, respectively, have been calculated.

Figure 11A:
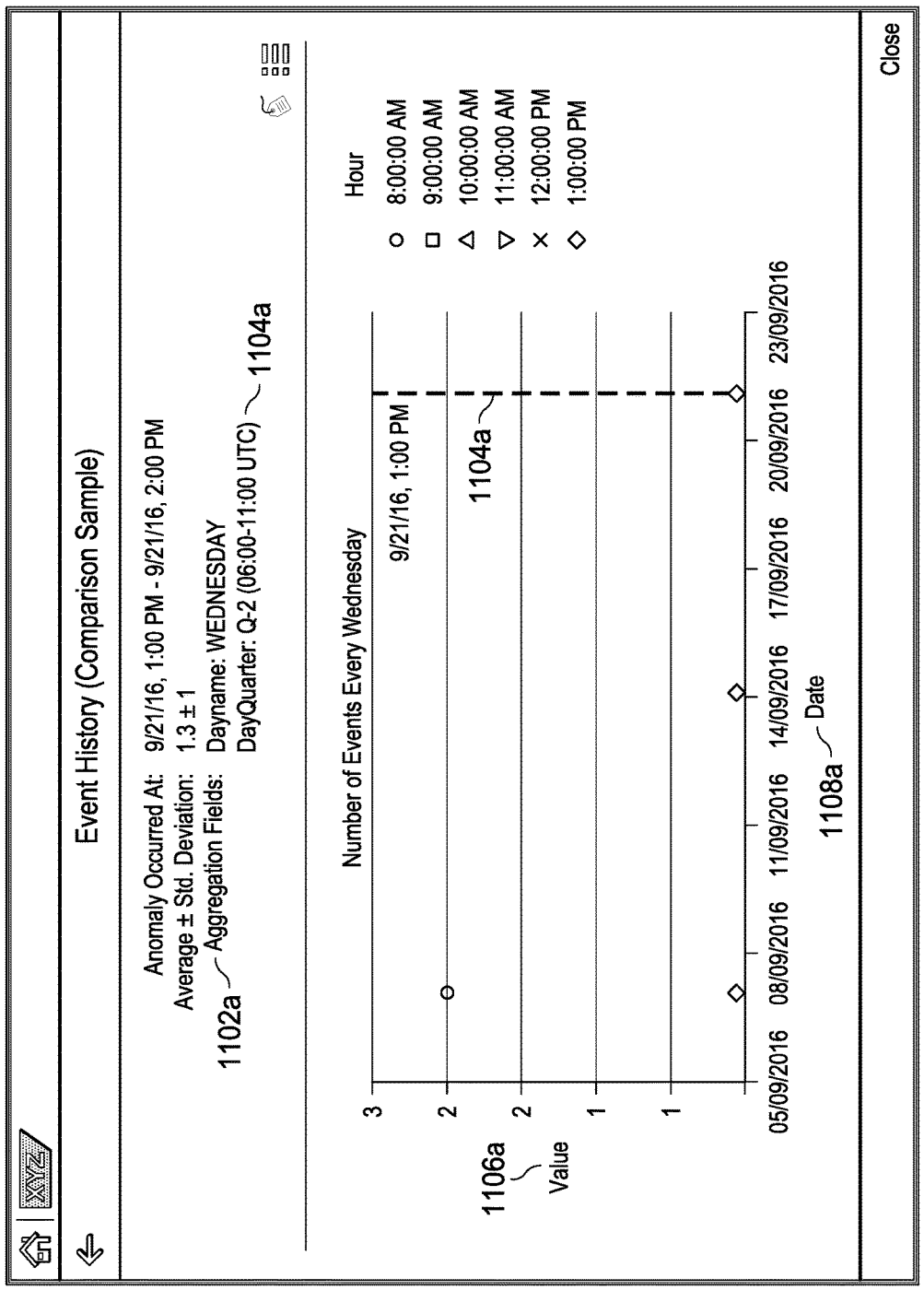
FIG. 11A is a screenshot illustrating an example ETD anomaly detection lab analysis GUI presenting additional data related to the generated alert data of FIG. 10, according to an implementation.

FIG. 11A is a screenshot illustrating an example ETD anomaly detection lab analysis GUI 1100a presenting additional data related to the generated alert data of FIG. 10, according to an implementation. Selecting link 1006 in FIG. 10 results in GUI 1100a displaying behavior of the last day 1102a (here, "WEDNESDAY") and allows comparison over a set date/time range 1104a of statistical data with corresponding data 1104a of the last day. Note that if there is not expected enough data available in a repository for a normal analysis, the GUI can be configured to use what data it can locate as well as performing comparisons with past timeframes.

Figure 11B:
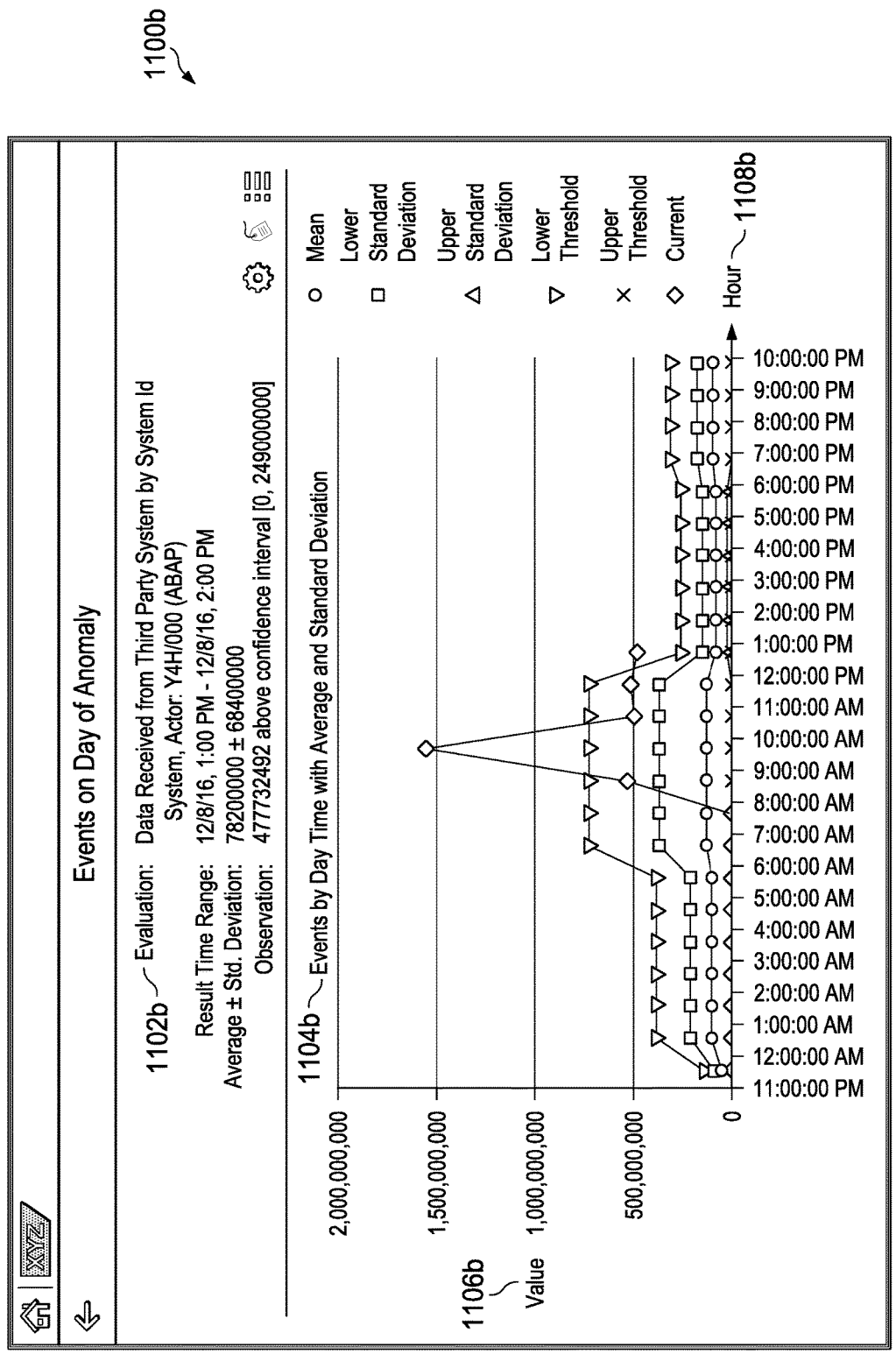
FIG. 11B is a screenshot illustrating an example ETD anomaly detection lab analysis GUI presenting additional data related to the generated alert data of FIG. 10, according to an implementation.

FIG. 11B is a screenshot illustrating an example ETD anomaly detection lab analysis GUI 1100b presenting additional data related to the generated alert data of FIG. 10. For example, FIG. 11 can be displayed when link 1010 is selected in FIG. 10. GUI 1100b displays events related to evaluation 1102b occurring on the day/time range of a specific anomaly. For example, graph 1104b illustrates "Events by Day Time with Average and Standard Deviation" with value 1106b and hour 1108b axes.

Figure 12A:
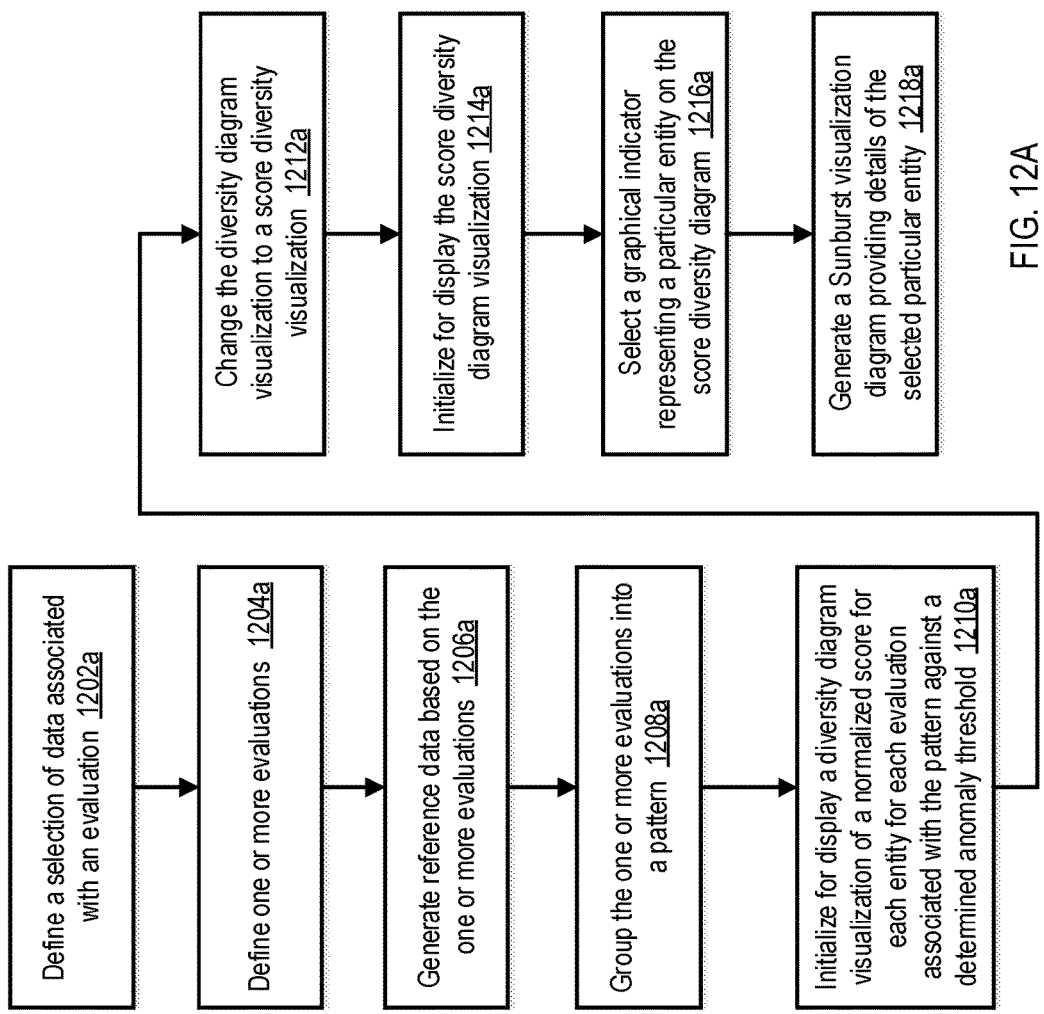
FIG. 12A is a flowchart illustrating an example method for enhanced enterprise threat detection (ETD), according to an implementation.

FIG. 12A is a flowchart illustrating an example method 1200a for enhanced enterprise threat detection (ETD), according to an implementation. For clarity of presentation, the description that follows generally describes method 1200a in the context of the other figures in this description. However, it will be understood that method 1200a may be performed, for example, by any suitable system, environment, software, and hardware, or a combination of systems, environments, software, and hardware as appropriate. In some implementations, various steps of method 1200a can be run in parallel, in combination, in loops, or in any order.

At 1202a, a chart is created, for example in a forensic lab application, to define a selection of data types from available log data for one or more evaluations of log events associated with an entity. The chart defines what is desired to be observed in the log data (for example, "Program Calls of Systems" as content). From 1202a, method 1200a proceeds to 1204a.

At 1204a, one or more evaluations associated with the entity are defined. Each evaluation defines, for example, time-based information and an evaluation method. From 1204a, method 1200a proceeds to 1206a.

At 1206a, reference data is generated based on each defined evaluation. Once a defined evaluation is activated, reference data is built up on regular basis (for example, through a scheduled job). From 1206a, method 1200a proceeds to 1208a.

At 1208a, the one or more evaluations are grouped into a pattern. From 1208a, method 1200a proceeds to 1210a.

At 1210a, initialize a visualization for display in a graphical user interface of a normalized score for each entity for each evaluation associated with the pattern against a determined anomaly threshold. For example, a security analyst can start a manual analysis to compare a selected time frame of reference data in a visualization (for example, FIG. 5 in an evaluation score diagram). Based on any alerts/indicators created by anomaly pattern execution, follow up analysis can take place in an anomaly detection lab or a forensic lab. From 1210a, method 1200a proceeds to 1212a.

At 1212a, a selection is received to change the diversity diagram visualization to a score diversity visualization. From 1212a, method 1200a proceeds to 1214a.

At 1214a, the score diversity diagram is initialized for visualization (for example, refer to FIGS. 12B, 13A-13F, and associated description). From 1214a, method 1200a proceeds to 1216a.

At 1216a, a selection is received for a particular graphical indicator in the score diversity diagram representing a particular entity. From 1216a, method 1200a proceeds to 1218a.

At 1218a, a Sunburst visualization is generated providing details of the particular entity. After 1218a, method 1200a stops.

Figure 12B:
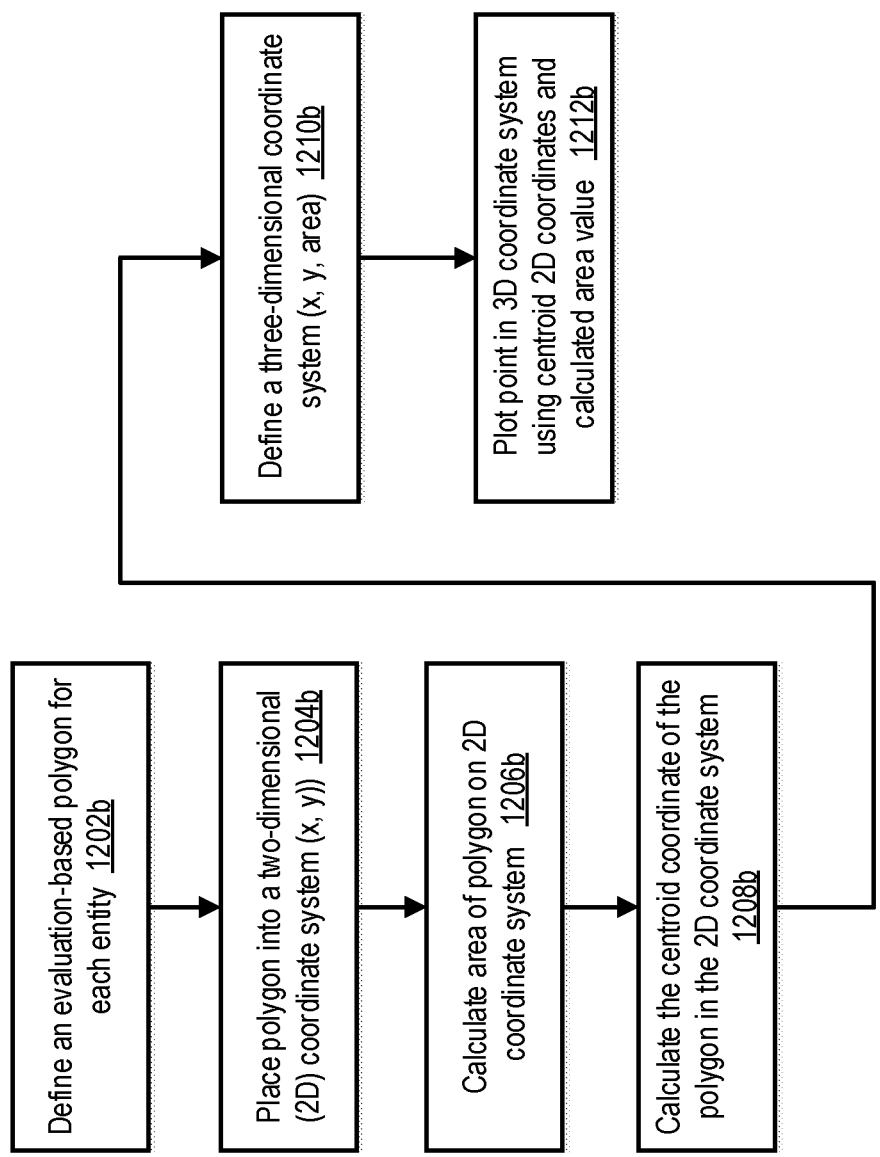
FIG. 12B is a flowchart illustrating an example method for generating a score diversity diagram, according to an implementation.

FIG. 12B is a flowchart illustrating an example method for generating a score diversity diagram, according to an implementation. For clarity of presentation, the description that follows generally describes method 1200b in the context of the other figures in this description. However, it will be understood that method 1200b may be performed, for example, by any suitable system, environment, software, and hardware, or a combination of systems, environments, software, and hardware as appropriate. In some implementations, various steps of method 1200b can be run in parallel, in combination, in loops, or in any order.

Figure 13A:
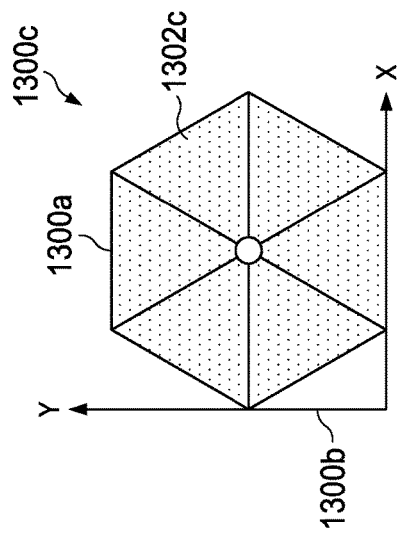
FIG. 13A illustrates an example polygon formed by six separate evaluations represented by a polygon axis, according to an implementation.

At 1202b, an evaluation-based polygon is defined for each entity (for example, using the score selector 604 as in FIG. 6 to select one or more entities 606). For example, referring to FIG. 6, each entity 606 in entity table 601c has an associated set of evaluation values defining a polygon. Referring to FIG. 13A, FIG. 13A illustrates an example polygon formed by six separate evaluations represented by a polygon axis (for example, axis 1302a), according to an implementation. FIG. 13A is presented for assisting in understanding the described concept. Returning to FIG. 12B, from 1202b, method 1200b proceeds to 1204b.

Figure 13B:
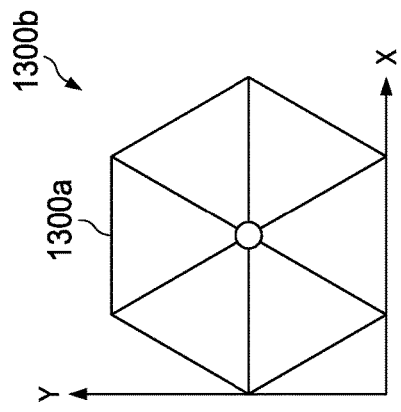
FIG. 13B illustrates the defined polygon of FIG. 13A placed into a 2D coordinate system, according to an implementation.

At 1204b, the defined polygon is placed into a two-dimensional (2D) coordinate system. Referring to FIG. 13B, FIG. 13B illustrates the defined polygon 1300a placed into a 2D (here, x, y coordinates) coordinate system 1300b, according to an implementation. Returning to FIG. 12B, from 1204b, method 1200b proceeds to 1206b.

Figure 13C:
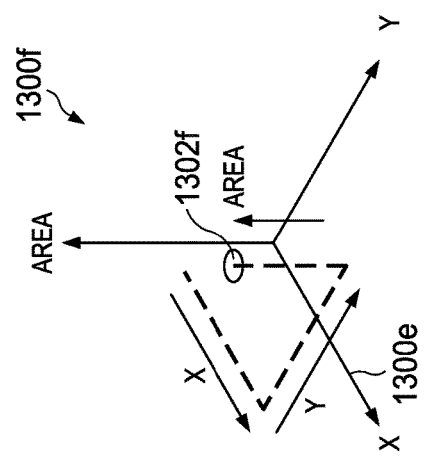
FIG. 13C illustrates the calculated area of the defined polygon of FIG. 13A placed into the 2D coordinate system of FIG. 13B, according to an implementation.

At 1206b, the area of the polygon is calculated based on the 2D coordinate system 1300b. Referring to FIG. 13C, FIG. 13C illustrates a calculated area 1302c of the defined polygon 1300a placed into the 2D coordinate system 1300b, according to an implementation. Returning to FIG. 12B, from 1206b, method 1200b proceeds to 1208b.

Figure 13E:
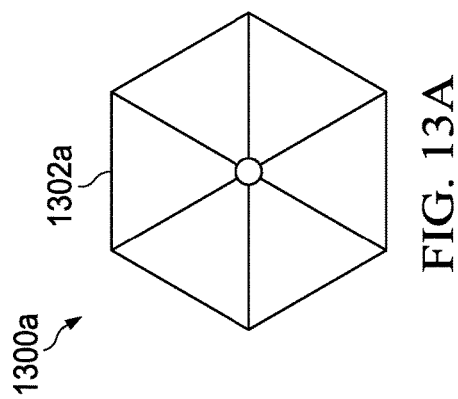
FIG. 13E illustrates a defined 3D coordinate system, according to an implementation.
Figure 13D:
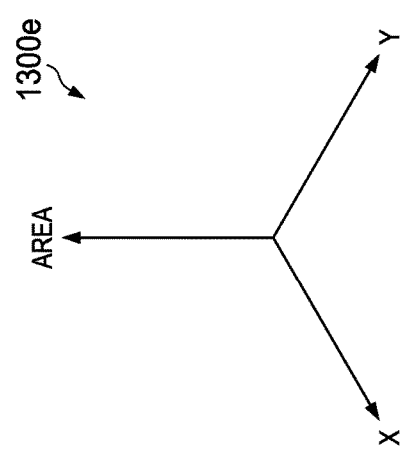
FIG. 13D illustrates a calculated centroid and centroid coordinates on the 2D coordinate system of the calculated area o FIG. 13C of the defined polygon of FIG. 13A placed into the 2D coordinate system of FIG. 13B, according to an implementation.

At 1208b, a centroid coordinate of the polygon in the 2D coordinate system is calculated. Referring to FIG. 13D, FIG.

13D illustrates a calculated centroid 1302*d* and centroid coordinates (here x1, y1) on the 2D coordinate system of the area 1302*c* of the defined polygon 1300*a* placed into the 2D coordinate system 1300*b*, according to an implementation. Returning to FIG. 12B, from 1208*b*, method 1200*b* proceeds to 1210*b*.

At 1210*b*, a 3D coordinate system is defined (here calculated centroid coordinates (x1, y1) and calculated polygon area from 1202*b*-1208*b* above). Referring to FIG. 13E, FIG. 13E illustrates a defined 3D coordinate system 1300*e*, according to an implementation. Returning to FIG. 12B, from 1210*b*, method 1200*b* proceeds to 1212*b*.

Figure 13F:
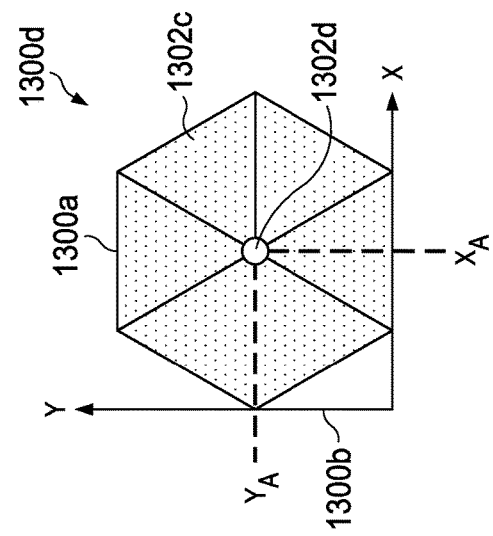
FIG. 13F illustrates a calculated point (based on centroid coordinates of FIG. 13D and calculated polygon area of FIG. 13C) for each entity plotted on the defined 3D coordinate system of FIG. 13E, according to an implementation.

At 1212*b*, the calculated centroid coordinates (x1, y1) and calculated polygon area for each entity is plotted onto the 3D coordinate system 1300*e*. Referring to FIG. 13F, FIG. 13F illustrates a calculated point 1302*f* (based on centroid coordinates (x1, y1) and calculated polygon area) for each entity plotted on the defined 3D coordinate system 1300*e*, according to an implementation. Returning to FIG. 12B, from 1212*b*, method 1200*b* stops.

Figure 14:
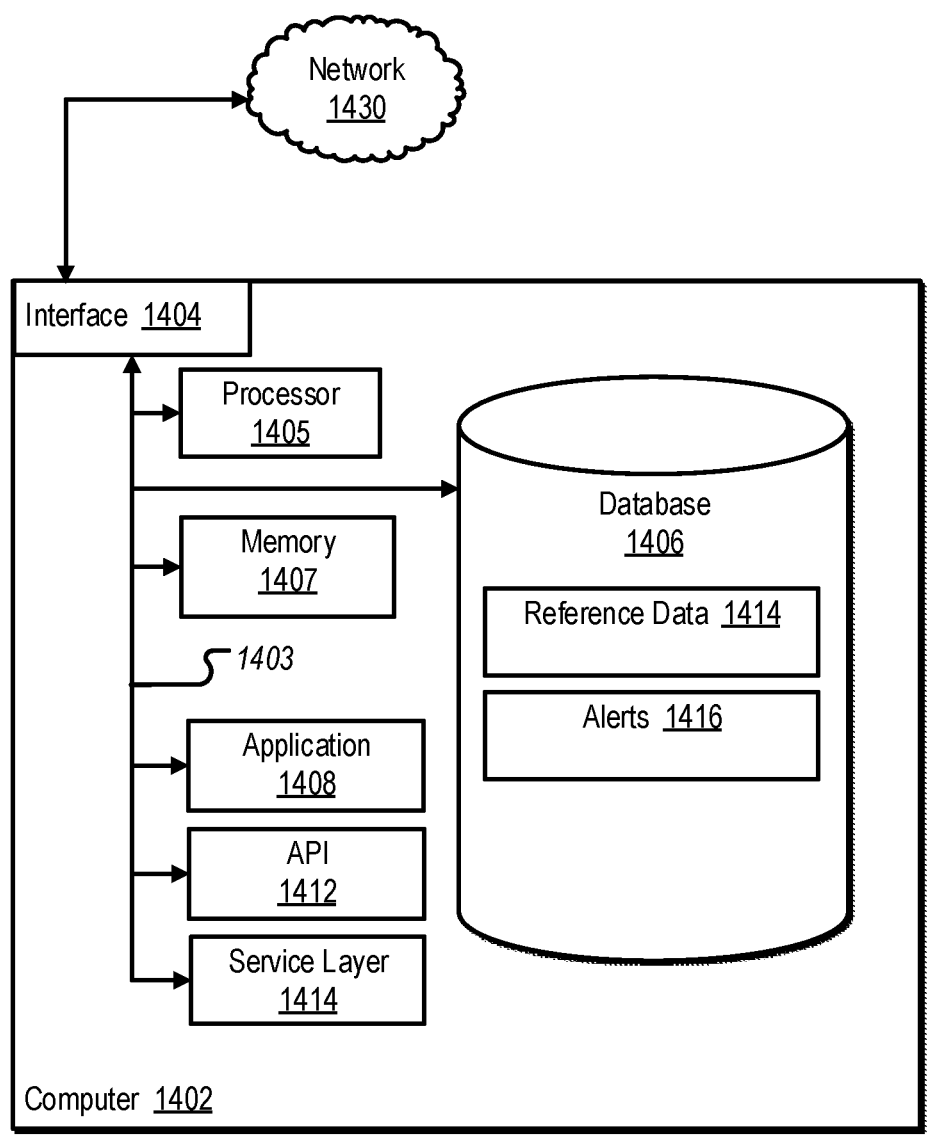
FIG. 14 is a block diagram of an exemplary computer system used to provide computational functionalities associated with described algorithms, methods, functions, processes, flows, and procedures as described in the instant disclosure, according to an implementation.

FIG. 14 is a block diagram of an exemplary computer system 1400 used to provide computational functionalities associated with described algorithms, methods, functions, processes, flows, and procedures as described in the instant disclosure, according to an implementation. The illustrated computer 1402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1402 may comprise a computer that includes an input device, such as a keypad, keyboard, touch screen, or other device that can accept user information, and an output device that conveys information associated with the operation of the computer 1402, including digital data, visual, or audio information (or a combination of information), or a graphical user interface (GUI).

The computer 1402 can serve in a role as a client, network component, a server, a database or other persistency, or any other component (or a combination of roles) of a computer system for performing the subject matter described in the instant disclosure. The illustrated computer 1402 is communicably coupled with a network 1430. In some implementations, one or more components of the computer 1402 may be configured to operate within environments, including cloud-computing-based, local, global, or other environment (or a combination of environments).

At a high level, the computer 1402 is an electronic computing device operable to receive, transmit, process, store, or manage data and information associated with the described subject matter. According to some implementations, the computer 1402 may also include or be communicably coupled with an application server, e-mail server, web server, caching server, streaming data server, or other server (or a combination of servers).

The computer 1402 can receive requests over network 1430 from a client application (for example, executing on another computer 1402) and responding to the received requests by processing the said requests in an appropriate software application. In addition, requests may also be sent to the computer 1402 from internal users (for example, from a command console or by other appropriate access method), external or third-parties, other automated applications, as well as any other appropriate entities, individuals, systems, or computers.

Each of the components of the computer 1402 can communicate using a system bus 1403. In some implementations, any or all of the components of the computer 1402, both hardware or software (or a combination of hardware and software), may interface with each other or the interface 1404 (or a combination of both) over the system bus 1403 using an application programming interface (API) 1412 or a service layer 1413 (or a combination of the API 1412 and service layer 1413). The API 1412 may include specifications for routines, data structures, and object classes. The API 1412 may be either computer-language independent or dependent and refer to a complete interface, a single function, or even a set of APIs. The service layer 1413 provides software services to the computer 1402 or other components (whether or not illustrated) that are communicably coupled to the computer 1402. The functionality of the computer 1402 may be accessible for all service consumers using this service layer. Software services, such as those provided by the service layer 1413, provide reusable, defined functionalities through a defined interface. For example, the interface may be software written in JAVA, C++, or other suitable language providing data in extensible markup language (XML) format or other suitable format. While illustrated as an integrated component of the computer 1402, alternative implementations may illustrate the API 1412 or the service layer 1413 as stand-alone components in relation to other components of the computer 1402 or other components (whether or not illustrated) that are communicably coupled to the computer 1402. Moreover, any or all parts of the API 1412 or the service layer 1413 may be implemented as child or sub-modules of another software module, enterprise application, or hardware module without departing from the scope of this disclosure.

The computer 1402 includes an interface 1404. Although illustrated as a single interface 1404 in FIG. 14, two or more interfaces 1404 may be used according to particular needs, desires, or particular implementations of the computer 1402. The interface 1404 is used by the computer 1402 for communicating with other systems in a distributed environment that are connected to the network 1430 (whether illustrated or not). Generally, the interface 1404 comprises logic encoded in software or hardware (or a combination of software and hardware) and operable to communicate with the network 1430. More specifically, the interface 1404 may comprise software supporting one or more communication protocols associated with communications such that the network 1430 or interface's hardware is operable to communicate physical signals within and outside of the illustrated computer 1402.

The computer 1402 includes a processor 1405. Although illustrated as a single processor 1405 in FIG. 14, two or more processors may be used according to particular needs, desires, or particular implementations of the computer 1402. Generally, the processor 1405 executes instructions and manipulates data to perform the operations of the computer 1402 and any algorithms, methods, functions, processes, flows, and procedures as described in the instant disclosure.

The computer 1402 also includes a database 1406 that can hold data for the computer 1402 or other components (or a combination of both) that can be connected to the network 1430 (whether illustrated or not). For example, database 1406 can be an in-memory, conventional, or other type of database storing data consistent with this disclosure. In some implementations, database 1406 can be a combination of two or more different database types (for example, a hybrid in-memory and conventional database) according to particular needs, desires, or particular implementations of the computer 1402 and the described functionality. Although illustrated as a single database 1406 in FIG. 14, two or more databases (of the same or combination of types) can be used according to particular needs, desires, or particular implementations of the computer 1402 and the described functionality. While database 1406 is illustrated as an integral component of the computer 1402, in alternative implementations, database 1406 can be external to the computer 1402. For purposes of example only, the database 1406 is illustrated as holding reference data 1413 and alert data 1416 as described above. As will be appreciated by those of ordinary skill in the art, the database 1406 can be configured to store any type of data consistent with this disclosure, whether or not explicitly described in this disclosure. The illustrated example data stored in database 1406 is not meant to limit the disclosure in any way.

The computer 1402 also includes a memory 1407 that can hold data for the computer 1402 or other components (or a combination of both) that can be connected to the network 1430 (whether illustrated or not). For example, memory 1407 can be random access memory (RAM), read-only memory (ROM), optical, magnetic, and the like storing data consistent with this disclosure. In some implementations, memory 1407 can be a combination of two or more different types of memory (for example, a combination of RAM and magnetic storage) according to particular needs, desires, or particular implementations of the computer 1402 and the described functionality. Although illustrated as a single memory 1407 in FIG. 14, two or more memories 1407 (of the same or combination of types) can be used according to particular needs, desires, or particular implementations of the computer 1402 and the described functionality. While memory 1407 is illustrated as an integral component of the computer 1402, in alternative implementations, memory 1407 can be external to the computer 1402.

The application 1408 is an algorithmic software engine providing functionality according to particular needs, desires, or particular implementations of the computer 1402, particularly with respect to functionality described in this disclosure. For example, application 1408 can serve as one or more components, modules, applications, etc. Further, although illustrated as a single application 1408, the application 1408 may be implemented as multiple applications 1407 on the computer 1402. In addition, although illustrated as integral to the computer 1402, in alternative implementations, the application 1408 can be external to the computer 1402.

There may be any number of computers 1402 associated with, or external to, a computer system containing computer 1402, each computer 1402 communicating over network 1430. Further, the term "client," "user," and other appropriate terminology may be used interchangeably as appropriate without departing from the scope of this disclosure. Moreover, this disclosure contemplates that many users may use one computer 1402, or that one user may use multiple computers 1402.

The computer 1402 also includes a memory 1407 that can hold data for the computer 1402 or other components (or a combination of both) that can be connected to the network 1430 (whether illustrated or not). For example, memory 1407 can be random access memory (RAM), read-only memory (ROM), optical, magnetic, and the like storing data consistent with this disclosure. In some implementations, memory 1407 can be a combination of two or more different types of memory (for example, a combination of RAM and magnetic storage) according to particular needs, desires, or particular implementations of the computer 1402 and the described functionality. Although illustrated as a single memory 1407 in FIG. 14, two or more memories 1407 (of the same or combination of types) can be used according to particular needs, desires, or particular implementations of the computer 1402 and the described functionality. While memory 1407 is illustrated as an integral component of the computer 1402, in alternative implementations, memory 1407 can be external to the computer 1402.

The application 1408 is an algorithmic software engine providing functionality according to particular needs, desires, or particular implementations of the computer 1402, particularly with respect to functionality described in this disclosure. For example, application 1408 can serve as one or more components, modules, applications, etc. Further, although illustrated as a single application 1408, the application 1408 may be implemented as multiple applications 1407 on the computer 1402. In addition, although illustrated as integral to the computer 1402, in alternative implementations, the application 1408 can be external to the computer 1402.

There may be any number of computers 1402 associated with, or external to, a computer system containing computer 1402, each computer 1402 communicating over network 1430. Further, the term "client," "user," and other appropriate terminology may be used interchangeably as appropriate without departing from the scope of this disclosure. Moreover, this disclosure contemplates that many users may use one computer 1402, or that one user may use multiple computers 1402.

Described implementations of the subject matter can include one or more features, alone or in combination.

For example, in a first implementation, a computer-implemented method, comprising: defining a selection of data types from available log data for an evaluation of events associated with an entity; defining one or more evaluations associated with the entity; generating reference data from the selection of data types based on the one or more defined evaluations; grouping the one or more evaluations into a pattern; and initializing for display in a graphical user interface a three dimensional (3D) score diversity diagram visualization, wherein a point representing the entity in the visualization is localized in 3D space at a coordinate based on two-dimensional (2D) coordinates in a 2D coordinate system of a centroid of the calculated area of a polygon placed to into the 2D coordinate system and defined by the values of each evaluation associated with the entity.

The foregoing and other described implementations can each optionally include one or more of the following features:

A first feature, combinable with any of the following features, further comprising defining the polygon for the entity based on the values of the one or more evaluations associated with the entity.

A second feature, combinable with any of the previous or following features, further comprising defining the 2D coordinate system for calculating the area of the polygon and the coordinates of the centroid of the calculated area of the polygon in the 2D coordinate system.

A third feature, combinable with any of the previous or following features, further comprising calculating the area of the polygon in the 2D coordinate system.

A fourth feature, combinable with any of the previous or following features, further comprising calculating the centroid coordinate of the calculated area of the polygon in the 2D coordinate system.

A fifth feature, combinable with any of the previous or following features, further comprising defining a 3D coordinate system, where the axes of the 3D coordinate system include the 2D coordinates of the calculated centroid of the calculated area of the polygon and the calculated area of the polygon.

A sixth feature, combinable with any of the previous or following features, further comprising plotting a point representing the entity in the 3D coordinate system using the values of the 2D coordinates of the calculated centroid of the calculated area of the polygon and the calculated area of the polygon.

In a second implementation, a non-transitory, computer-readable medium storing one or more instructions executable by a computer system to perform operations comprising: defining a selection of data types from available log data for an evaluation of events associated with an entity; defining one or more evaluations associated with the entity; generating reference data from the selection of data types based on the one or more defined evaluations; grouping the one or more evaluations into a pattern; and initializing for display in a graphical user interface a three dimensional (3D) score diversity diagram visualization, wherein a point representing the entity in the visualization is localized in 3D space at a coordinate based on two-dimensional (2D) coordinates in a 2D coordinate system of a centroid of the calculated area of a polygon placed to into the 2D coordinate system and defined by the values of each evaluation associated with the entity.

The foregoing and other described implementations can each optionally include one or more of the following features:

A first feature, combinable with any of the following features, further comprising one or more instructions to define the polygon for the entity based on the values of the one or more evaluations associated with the entity.

A second feature, combinable with any of the previous or following features, further comprising one or more instructions to define the 2D coordinate system for calculating the area of the polygon and the coordinates of the centroid of the calculated area of the polygon in the 2D coordinate system.

A third feature, combinable with any of the previous or following features, further comprising one or more instructions to calculate the area of the polygon in the 2D coordinate system.

A fourth feature, combinable with any of the previous or following features, further comprising one or more instructions to calculate the centroid coordinate of the calculated area of the polygon in the 2D coordinate system.

A fifth feature, combinable with any of the previous or following features, further comprising one or more instructions to define a 3D coordinate system, where the axes of the 3D coordinate system include the 2D coordinates of the calculated centroid of the calculated area of the polygon and the calculated area of the polygon.

A sixth feature, combinable with any of the previous or following features, further comprising one or more instructions to plot a point representing the entity in the 3D coordinate system using the values of the 2D coordinates of the calculated centroid of the calculated area of the polygon and the calculated area of the polygon.

In a third implementation, a computer-implemented system, comprising: a computer memory; and a hardware processor interoperably coupled with the computer memory and configured to perform operations comprising: defining a selection of data types from available log data for an evaluation of events associated with an entity; defining one or more evaluations associated with the entity; generating reference data from the selection of data types based on the one or more defined evaluations; grouping the one or more evaluations into a pattern; and initializing for display in a graphical user interface a three dimensional (3D) score diversity diagram visualization, wherein a point representing the entity in the visualization is localized in 3D space at a coordinate based on two-dimensional (2D) coordinates in a 2D coordinate system of a centroid of the calculated area of a polygon placed to into the 2D coordinate system and defined by the values of each evaluation associated with the entity.

The foregoing and other described implementations can each optionally include one or more of the following features:

A first feature, combinable with any of the following features, further configured to define the polygon for the entity based on the values of the one or more evaluations associated with the entity.

A second feature, combinable with any of the previous or following features, further configured to define the 2D coordinate system for calculating the area of the polygon and the coordinates of the centroid of the calculated area of the polygon in the 2D coordinate system.

A third feature, combinable with any of the previous or following features, further configured to calculate the area of the polygon in the 2D coordinate system.

A fourth feature, combinable with any of the previous or following features, further configured to calculate the centroid coordinate of the calculated area of the polygon in the 2D coordinate system.

A fifth feature, combinable with any of the previous or following features, further configured to define a 3D coordinate system, where the axes of the 3D coordinate system include the 2D coordinates of the calculated centroid of the calculated area of the polygon and the calculated area of the polygon.

A sixth feature, combinable with any of the previous or following features, further configured to plot a point representing the entity in the 3D coordinate system using the values of the 2D coordinates of the calculated centroid of the calculated area of the polygon and the calculated area of the polygon.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    defining a selection of data types from available log data for an evaluation of events associated with an entity;
    defining one or more evaluations associated with the entity;
    generating reference data from the selection of data types based on the one or more defined evaluations;
    grouping the one or more evaluations into a pattern;
    defining a polygon for the entity based on values of one or more evaluations associated with the entity;
    defining a two-dimensional (2D) coordinate system for calculating an area of a polygon placed into the 2D coordinate system and coordinates of a centroid of the calculated area of the polygon in the 2D coordinate system; and
    initializing for display in a graphical user interface a three dimensional (3D) score diversity diagram visualization, wherein a point representing the entity in the visualization is localized in 3D space at a coordinate based on 2D coordinates in the 2D coordinate system of the centroid of the calculated area of the polygon placed into the 2D coordinate system and defined by the values of the one or more evaluations associated with the entity.

2. The computer-implemented method of claim 1, further comprising calculating the area of the polygon in the 2D coordinate system.

3. The computer-implemented method of claim 2, further comprising calculating the centroid coordinate of the calculated area of the polygon in the 2D coordinate system.

4. The computer-implemented method of claim 3, further comprising defining a 3D coordinate system, where the axes of the 3D coordinate system include the 2D coordinates of the calculated centroid of the calculated area of the polygon and the calculated area of the polygon.

5. The computer implemented method of claim 4, further comprising plotting a point representing the entity in the 3D coordinate system using the values of the 2D coordinates of the calculated centroid of the calculated area of the polygon and the calculated area of the polygon.

6. A non-transitory, computer-readable medium storing one or more instructions executable by a computer system to perform operations comprising:
    defining a selection of data types from available log data for an evaluation of events associated with an entity;
    defining one or more evaluations associated with the entity;
    generating reference data from the selection of data types based on the one or more defined evaluations;
    grouping the one or more evaluations into a pattern;
    defining a polygon for the entity based on values of one or more evaluations associated with the entity;
    defining a two-dimensional (2D) coordinate system for calculating an area of a polygon placed into the 2D coordinate system and coordinates of a centroid of the calculated area of the polygon in the 2D coordinate system; and
    initializing for display in a graphical user interface a three dimensional (3D) score diversity diagram visualization, wherein a point representing the entity in the visualization is localized in 3D space at a coordinate based on 2D coordinates in the 2D coordinate system of the centroid of the calculated area of the polygon placed into the 2D coordinate system and defined by the values of the one or more evaluations associated with the entity.

7. The non-transitory, computer-readable medium of claim 6, further comprising one or more instructions to calculate the area of the polygon in the 2D coordinate system.

8. The non-transitory, computer-readable medium of claim 7, further comprising one or more instructions to calculate the centroid coordinate of the calculated area of the polygon in the 2D coordinate system.

9. The non-transitory, computer-readable medium of claim 8, further comprising one or more instructions to define a 3D coordinate system, where the axes of the 3D coordinate system include the 2D coordinates of the calculated centroid of the calculated area of the polygon and the calculated area of the polygon.

10. The non-transitory, computer-readable medium of claim 9, further comprising one or more instructions to plot a point representing the entity in the 3D coordinate system using the values of the 2D coordinates of the calculated centroid of the calculated area of the polygon and the calculated area of the polygon.

11. A computer-implemented system, comprising:
    a computer memory; and
    a hardware processor interoperably coupled with the computer memory and configured to perform operations comprising:
        defining a selection of data types from available log data for an evaluation of events associated with an entity;
        defining one or more evaluations associated with the entity;
        generating reference data from the selection of data types based on the one or more defined evaluations;
        grouping the one or more evaluations into a pattern;
        defining a polygon for the entity based on values of one or more evaluations associated with the entity;
        defining a two-dimensional (2D) coordinate system for calculating an area of a polygon placed into the 2D coordinate system and coordinates of a centroid of the calculated area of the polygon in the 2D coordinate system; and
        initializing for display in a graphical user interface a three dimensional (3D) score diversity diagram visualization, wherein a point representing the entity in the visualization is localized in 3D space at a coordinate based on 2D coordinates in the 2D coordinate system of the centroid of the calculated area of the polygon placed into the 2D coordinate system and defined by the values of the one or more evaluations associated with the entity.

12. The computer-implemented system of claim 11, further configured to calculate the area of the polygon in the 2D coordinate system.

13. The computer-implemented system of claim 12, further configured to calculate the centroid coordinate of the calculated area of the polygon in the 2D coordinate system.

14. The computer-implemented system of claim 13, further configured to define a 3D coordinate system, where the axes of the 3D coordinate system include the 2D coordinates of the calculated centroid of the calculated area of the polygon and the calculated area of the polygon.

15. The computer-implemented system of claim 14, further configured to plot a point representing the entity in the 3D coordinate system using the values of the 2D coordinates of the calculated centroid of the calculated area of the polygon and the calculated area of the polygon.

* * * * *